(12) United States Patent
Kakuda

(10) Patent No.: US 12,113,944 B2
(45) Date of Patent: Oct. 8, 2024

(54) MEDIUM CONVEYING APPARATUS IN WHICH ROTATION FULCRUM OF REFERENCE MEMBER IS LOCATED INSIDE GUIDE FOR SLIDING OF UNIT PROVIDED WITH REFERENCE MEMBER

(71) Applicant: PFU LIMITED, Kahoku (JP)

(72) Inventor: Hirotoshi Kakuda, Kahoku (JP)

(73) Assignee: PFU LIMITED, Kahoku (JP)

( * ) Notice: Subject to any disclaimer, the term of this patent is extended or adjusted under 35 U.S.C. 154(b) by 208 days.

(21) Appl. No.: 17/812,845

(22) Filed: Jul. 15, 2022

(65) Prior Publication Data

US 2023/0059480 A1    Feb. 23, 2023

(30) Foreign Application Priority Data

Aug. 19, 2021    (JP) ................................ 2021-134044

(51) Int. Cl.
| | |
|---|---|
| *H04N 1/00* | (2006.01) |
| *B65H 5/06* | (2006.01) |
| *B65H 5/36* | (2006.01) |
| *H04N 1/12* | (2006.01) |

(52) U.S. Cl.
CPC .......... *H04N 1/00535* (2013.01); *B65H 5/062* (2013.01); *B65H 5/36* (2013.01); *H04N 1/00533* (2013.01); *H04N 1/00615* (2013.01); *H04N 1/1225* (2013.01); *B65H 2301/544* (2013.01); *B65H 2801/06* (2013.01)

(58) Field of Classification Search
CPC .......... B65H 3/0661; B65H 5/36; B65H 5/38; B65H 2301/544; H04N 1/00533; H04N 1/00535; H04N 1/00615; H04N 1/00716; H04N 1/1225; H04N 1/125
See application file for complete search history.

(56) References Cited

U.S. PATENT DOCUMENTS

| | | | |
|---|---|---|---|
| 2003/0047862 A1* | 3/2003 | Komatsu | .................. B65H 5/38 271/10.01 |
| 2008/0180763 A1* | 7/2008 | Nishizawa | ........... H04N 1/1235 358/498 |

(Continued)

FOREIGN PATENT DOCUMENTS

| | | |
|---|---|---|
| JP | 2017-98614 A | 6/2017 |
| JP | 2017-98717 A | 6/2017 |

*Primary Examiner* — Prasad V Gokhale
(74) *Attorney, Agent, or Firm* — LEWIS ROCA ROTHGERBER CHRISTIE LLP

(57) ABSTRACT

A medium conveying apparatus includes a conveying roller to convey a medium, a first unit, a second unit located to face the first unit, an imaging sensor provided in the first unit, to image the medium conveyed by the conveying roller, a reference member including a facing surface, and provided in the second unit in such a way that the facing surface is rotatable between a facing position at which the facing surface faces the imaging sensor, and a non-facing position at which the facing surface deviates from the facing position, a guide portion to slidably guide the second unit in a direction perpendicular to a medium conveying surface so that the second unit moves in the direction perpendicular to the medium conveying surface, and a support portion to rotatably support the reference member. The support portion is located inside the guide portion.

6 Claims, 22 Drawing Sheets

(56) References Cited

U.S. PATENT DOCUMENTS

| | | | |
|---|---|---|---|
| 2014/0063573 A1* | 3/2014 | Yonemura | H04N 1/00244 358/498 |
| 2014/0079460 A1* | 3/2014 | Kanaya | B65H 3/0653 400/583 |
| 2017/0142289 A1 | 5/2017 | Yoshita et al. | |
| 2018/0262646 A1 | 9/2018 | Gotoh et al. | |
| 2021/0243316 A1* | 8/2021 | Tezuka | H04N 1/00525 |

* cited by examiner

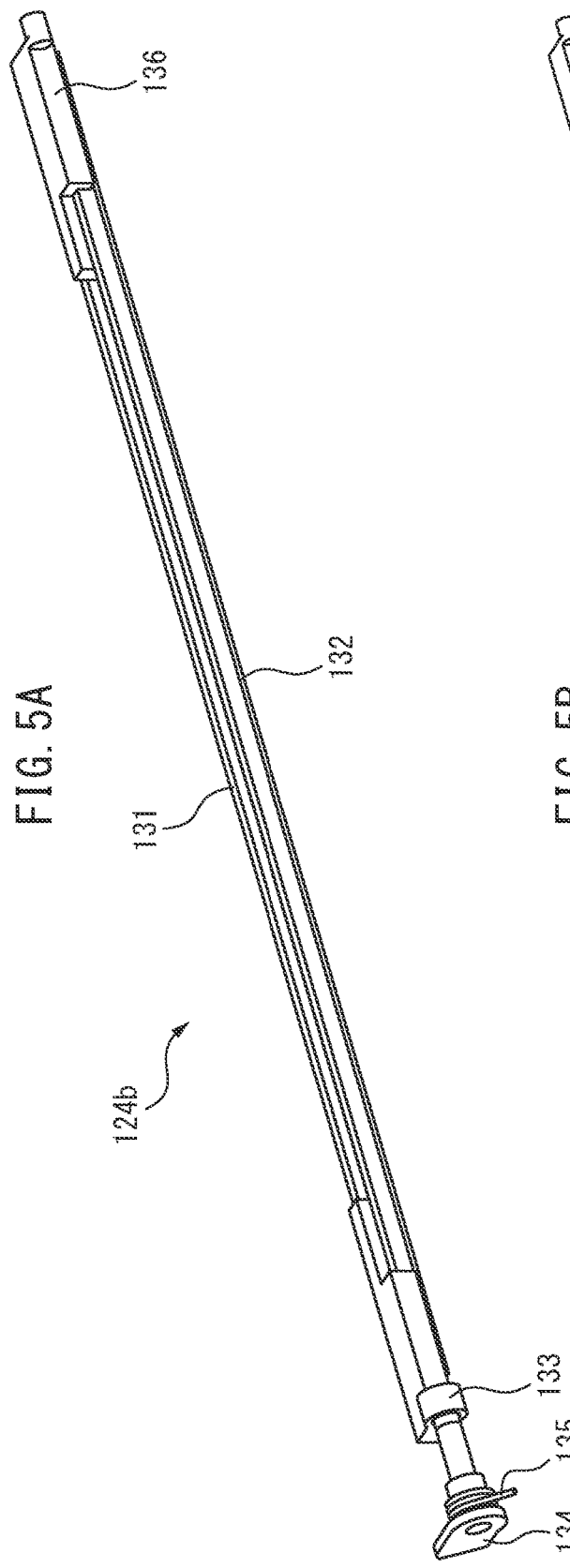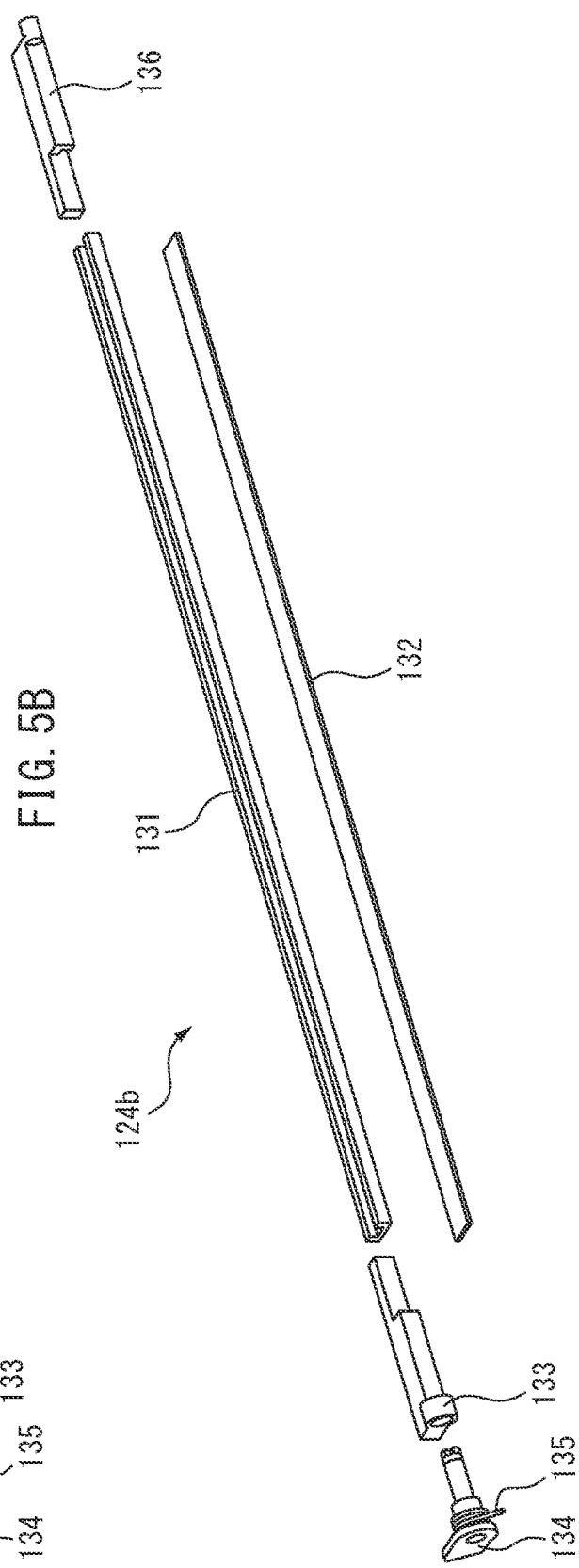

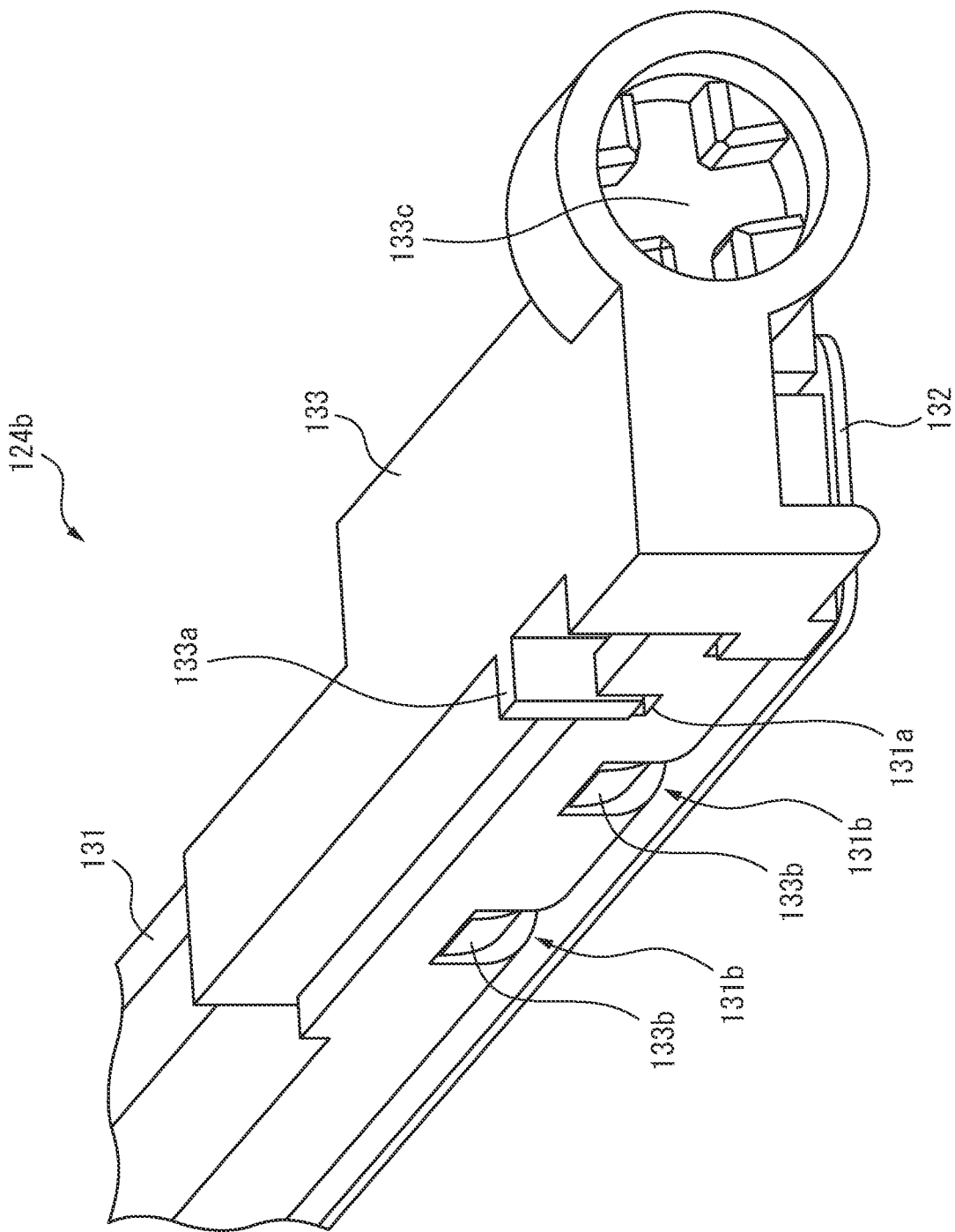

FIG. 8
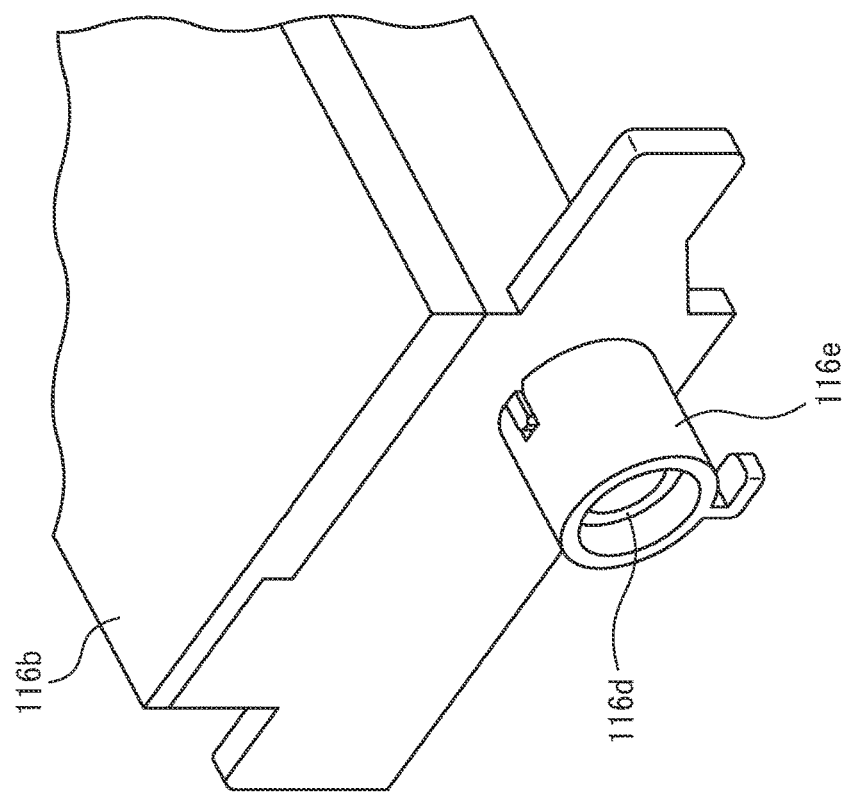
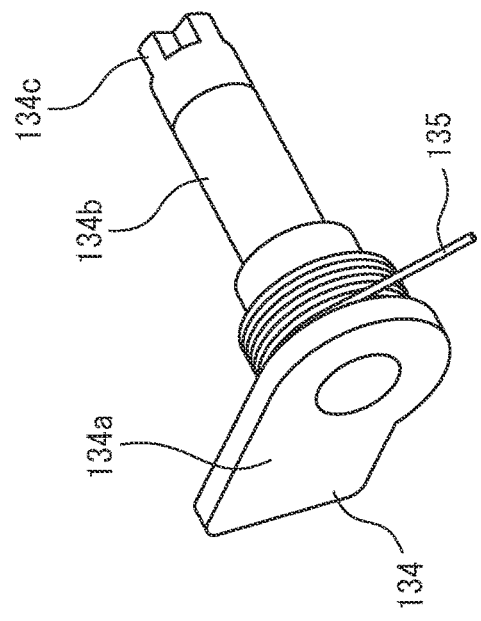

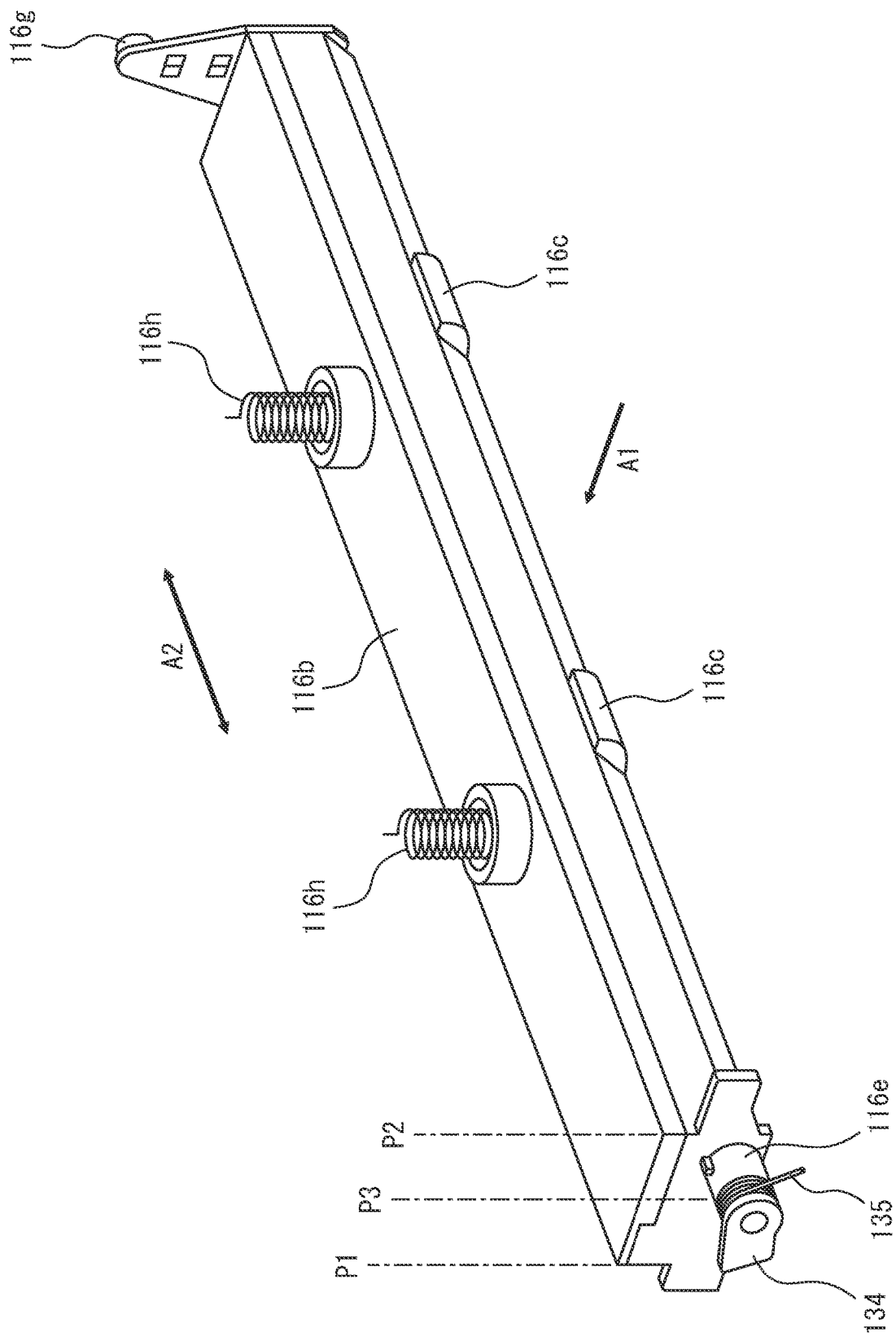
F I G. 11

MEDIUM CONVEYING APPARATUS IN WHICH ROTATION FULCRUM OF REFERENCE MEMBER IS LOCATED INSIDE GUIDE FOR SLIDING OF UNIT PROVIDED WITH REFERENCE MEMBER

CROSS-REFERENCE TO RELATED APPLICATIONS

This application is based upon and claims the benefit of priority of prior Japanese Patent Application No. 2021-134044, filed on Aug. 19, 2021, the entire contents of which are incorporated herein by reference.

TECHNICAL FIELD

Embodiments discussed in the present specification relate to conveying a medium.

BACKGROUND

A medium conveying apparatus such as a scanner device to image a medium while conveying the medium is required to satisfactorily image the medium with various thicknesses. Accordingly, a medium conveying apparatus in which a unit located to face an imaging device to image the medium is located so as to move according to a thickness of the medium has been developed. In general, the medium conveying apparatus is provided with a reference member in the unit located to face the imaging device, has a function of changing a background color of the medium to white or black, by switching a position of the reference member.

An image reading apparatus including an imaging device for imaging a document and a backing including an facing surface having a white color, is disclosed (refer to Japanese Unexamined Patent Publication No. 2017-98614). The image reading device switches the backing between a facing position at which the facing surface faces the imaging device so that the imaging device acquires a white reference image, and a non-facing position at which the facing surface deviates from the facing position so that the imaging device acquires a black reference image.

An image reading apparatus including a reading sensor movably provided in a document conveying direction in a sensor case mounted along a conveying path, to read one surface of the document, and a background member provided to face the reading sensor in between a conveying path, is disclosed refer to Japanese Unexamined Patent Publication No. 2017-98717).

SUMMARY

According to some embodiments, a medium conveying apparatus includes a conveying roller to convey a medium, a first unit, a second unit located to face the first unit, an imaging sensor provided in the first unit, to image the medium conveyed by the conveying roller, a reference member including a facing surface, and provided in the second unit in such a way that the facing surface is rotatable between a facing position at which the facing surface faces the imaging sensor, and a non-facing position at which the facing surface deviates from the facing position, a guide portion to slidably guide the second unit in a direction perpendicular to a medium conveying surface so that the second unit moves in the direction perpendicular to the medium conveying surface, and a support portion to rotatably support the reference member. The support portion is located inside the guide portion.

BRIEF DESCRIPTION OF DRAWINGS

FIG. 5A is a schematic diagram for illustrating a second backing member 124b.

FIG. 5B is a schematic diagram for illustrating the second backing member 124b.

FIG. 6 is a schematic diagram for illustrating a second support member 133, etc.

FIG. 8 is a schematic diagram for illustrating a second cam member 134, etc.

FIG. 11 is a schematic diagram for illustrating the second imaging unit 116b.

DESCRIPTION OF EMBODIMENTS

It is to be understood that both the foregoing general description and the following detailed description are exemplary and explanatory, and are not restrictive of the invention, as claimed.

Hereinafter, a medium conveying apparatus according to an embodiment, will be described with reference to the drawings. However, it should be noted that the technical scope of the invention is not limited to these embodiments, and extends to the inventions described in the claims and their equivalents.

Figure 1:
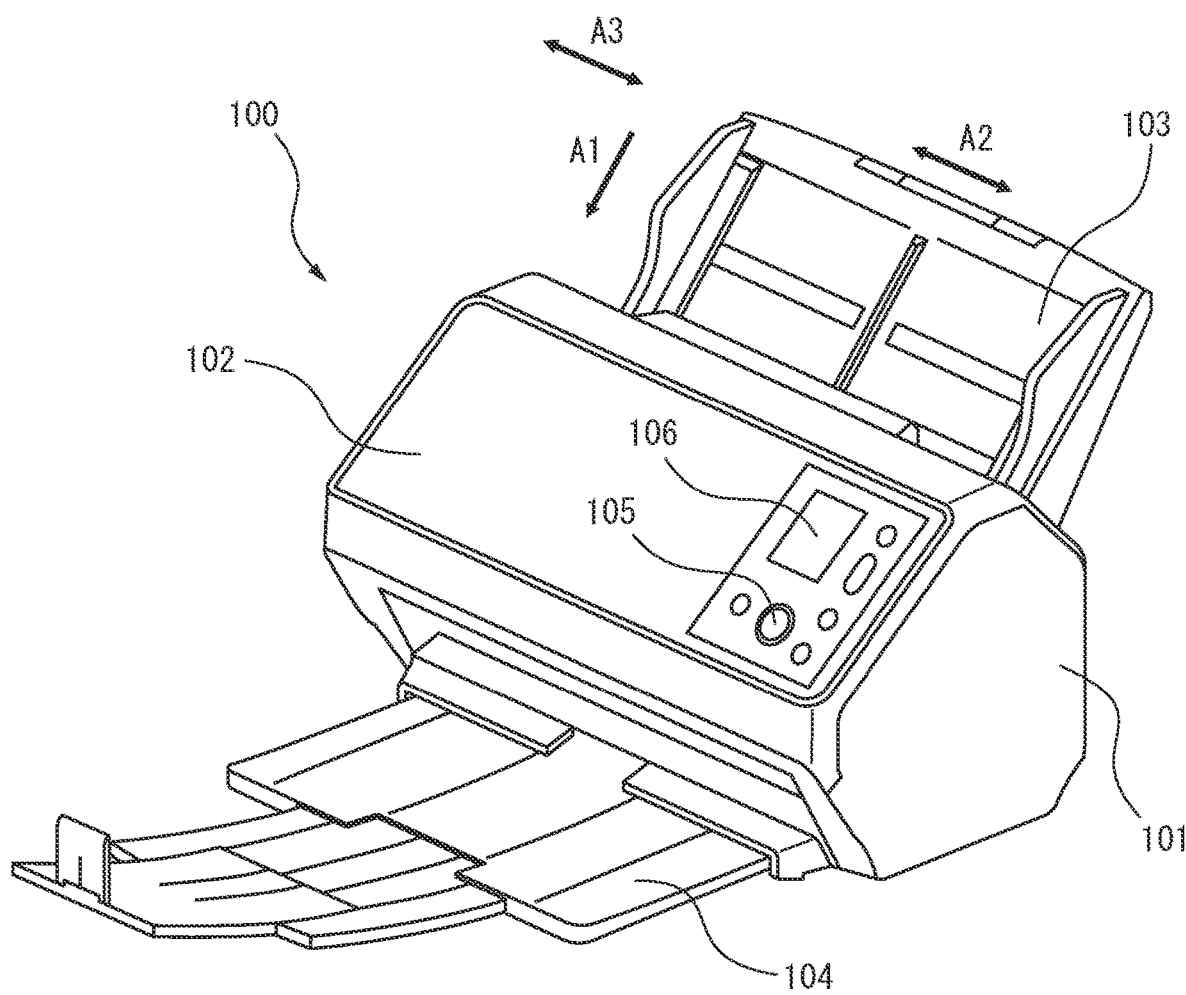
FIG. 1 is a perspective view illustrating a medium conveying apparatus 100 according to an embodiment.

FIG. 1 is a perspective view illustrating a medium conveying apparatus 100 configured as an image scanner. The medium conveying apparatus 100 conveys and images a medium being a document. The media is a paper, a thick paper, a plastic card, a passport or a booklet, etc. The medium conveying apparatus 100 may be a fax machine, a copying machine, a multifunctional peripheral (MFP), etc.

The medium conveying apparatus 100 includes a lower housing 101, an upper housing 102, a medium tray 103, an ejection tray 104, an operation device 105, and a display device 106. In FIG. 1, an arrow A1 indicates a medium conveying direction, and an arrow A2 indicates a width direction perpendicular to the medium conveying direction A1, and an arrow A3 indicates a height direction perpendicular to the medium conveying surface. Hereinafter, an upstream refers to an upstream in the medium conveying direction A1, and a downstream refers to a downstream in the medium conveying direction A1.

The upper housing 102 is located in a position covering a top surface of the medium conveying apparatus 100, and is engaged with the lower housing 101. The medium tray 103 is engaged with the lower housing 101 in such a way as to be able to place a medium to be conveyed. The ejection tray 104 is engaged with the lower housing 101 in such a way as to be able to hold an ejected medium. The ejection tray 104 may be engaged with the upper housing 102.

The operation device 105 includes an input device such as a button, and an interface circuit acquiring a signal from the input device, receives an input operation by a user, and outputs an operation signal based on the input operation by the user. The display device 106 includes a display including a liquid crystal or organic electro-luminescence (EL), and an interface circuit for outputting image data to the display, and displays the image data on the display.

Figure 2:
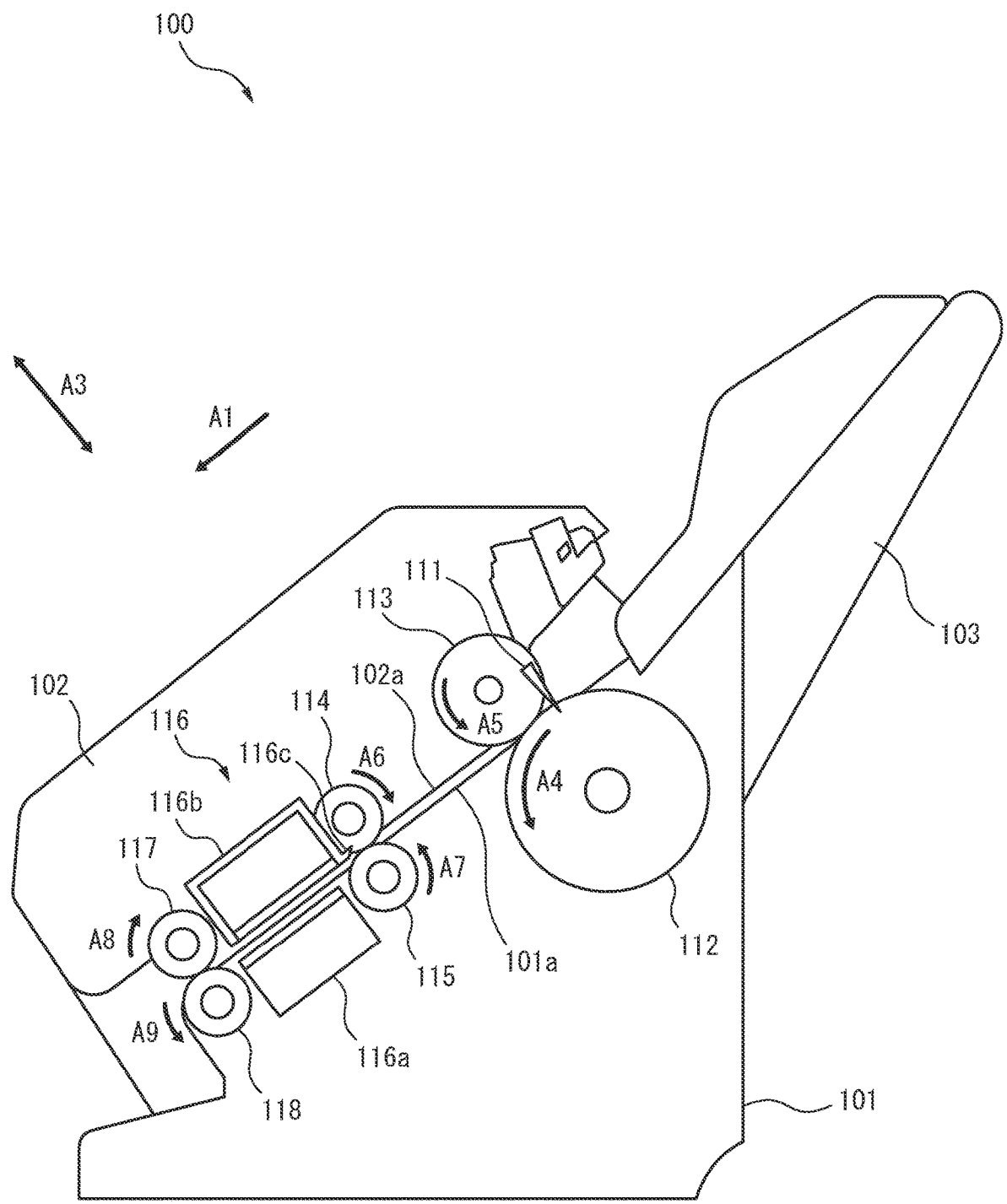
FIG. 2 is a diagram for illustrating a conveyance path inside the medium conveying apparatus 100.

FIG. 2 is a diagram for illustrating a conveyance path inside the medium conveying apparatus 100.

The conveyance path inside the medium conveying apparatus 100 includes a medium sensor 111, a feed roller 112, a separation roller 113, a first conveyance roller 114, a second conveyance roller 115, an imaging unit 116, a first ejection roller 117 and a second ejection roller 118, etc. The feed roller 112, the separation roller 113, the first conveyance roller 114, the second conveyance roller 115, the first ejection roller 117 or the second ejection roller 118 is an example of a conveying roller to convey the medium. The number of each roller is not limited to one, and may be plural.

A top surface of the lower housing 101 forms a lower guide 101a of a conveyance path of a medium, and a bottom surface of the upper housing 102 forms an upper guide 102a of the conveyance path of a medium. The lower guide 101a or the upper guide 102a forms a medium conveying surface for conveying the medium.

The medium sensor 111 is located on the upstream side of the feed roller 112 and the separation roller 113. The medium sensor 111 includes a contact detection sensor, and detects whether or not the medium is placed on the medium tray 103. The medium sensor 111 generates and outputs a medium signal whose signal value changes in a state where the medium is placed on the medium tray 103 and a state where it is not placed. The medium sensor 111 is not limited to the contact detection sensor, any other sensor, such as a light detection sensor, capable of detecting the presence or absence of the medium may be used as the medium sensor 111.

The feed roller 112 is provided on the lower housing 101, and sequentially separate and feed media placed on the medium tray 103 from the lower side. The separation roller 113 is a so-called brake roller or retard roller, is provided on the upper housing 102, and is located to face the feed roller 112, to rotate in the opposite direction of the medium feeding direction.

The first conveyance roller 114 and the second conveyance roller 115 are provided on the upstream side of the feed roller 112 and the separation roller 113 and on the downstream side of the imaging unit 116. The first conveyance roller 114 and the second conveyance roller 115 are provided to face each other on the upper housing 102 and the lower housing 101, respectively, to convey the medium fed by the feed roller 112 and the separation roller 113 to the imaging unit 116.

The imaging unit 116 is located on the downstream side of the first conveyance roller 114 and the second conveyance roller 115, and on the upstream side of the first ejection roller 117 and the second ejection roller 118. The imaging unit 116 includes a first imaging unit 116a, and a second imaging unit 116b and an imaging unit guide 116c located to face each other with the medium conveyance path in between.

The first imaging unit 116a is an example of a first unit, and is provided on the lower housing 101. The second imaging unit 116b is an example of a second unit, and is located in the upper housing 102 to face the first imaging unit 116a. The imaging unit guide 116c is provided on the outer side and the upstream side of the second imaging unit 116b. The imaging unit guide 116c guides a front end of the medium conveyed by the first conveyance roller 114 and the second conveyance roller 115 between the first imaging unit 116a and the second imaging unit 116b.

The first ejection roller 117 and the second ejection roller 118 are provided on the downstream side of the imaging unit 116. The first ejection roller 117 and the second ejection roller 118 are provided to face each other on the upper housing 102 and the lower housing 101, respectively, to eject the medium conveyed by the first conveyance roller 114 and the second conveyance roller 115, and imaged by the imaging unit 116 to the ejection tray 104.

A medium placed on the medium tray 103 is conveyed between the lower guide 101a and the upper guide 101b in the medium conveying direction A1 by the feed roller 112 rotating in a direction of an arrow A4 in FIG. 2. The separation roller 113 rotates in a direction of an arrow A5, that is, in a direction opposite to the medium feeding direction, when the medium is fed. By the workings of the feed roller 112 and the separation roller 113, when a plurality of media are placed on the medium tray 103, only the medium in contact with the feed roller 112, out of the media placed on the medium tray 103, is separated. Consequently, conveyance of a medium other than the separated medium is restricted (prevention of multi-feed)

The medium is fed between the first conveyance roller 114 and the second conveyance roller 115 while being guided by the lower guide 101a and the upper guide 101b. The medium is fed between the first imaging unit 116a and the second imaging unit 116b by the first conveyance roller 114 and the second conveyance roller 115 rotating in directions of arrows A6 and A7, respectively. The medium read by the first imaging unit 116a and the second imaging unit 116b is ejected on the ejection tray 104 by the first ejection roller 117 and the second ejection roller 118 rotating in directions of arrows A8 and A9, respectively.

Figure 3:
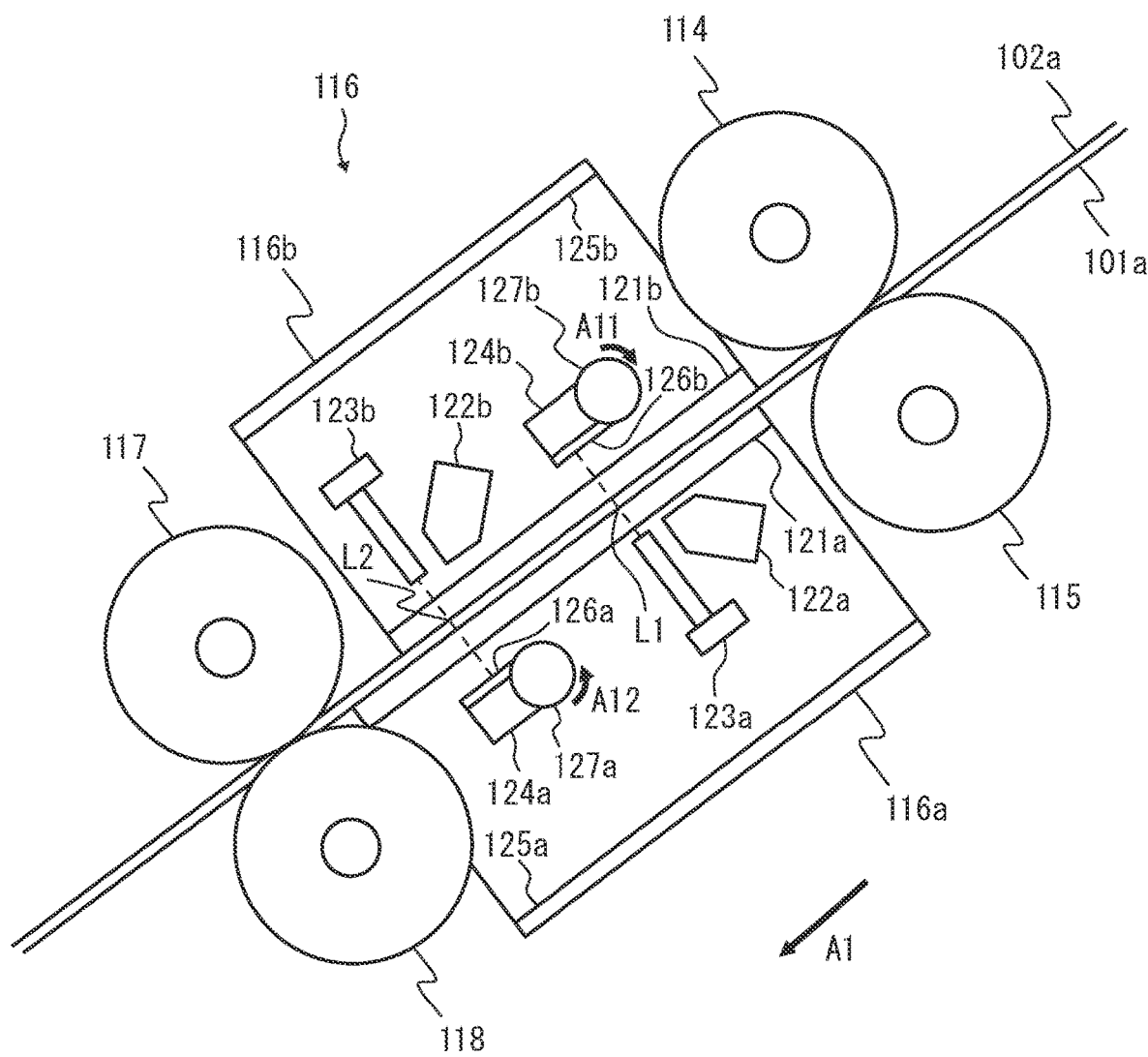
FIG. 3 is a schematic diagram for illustrating an imaging unit 116.
Figure 4:
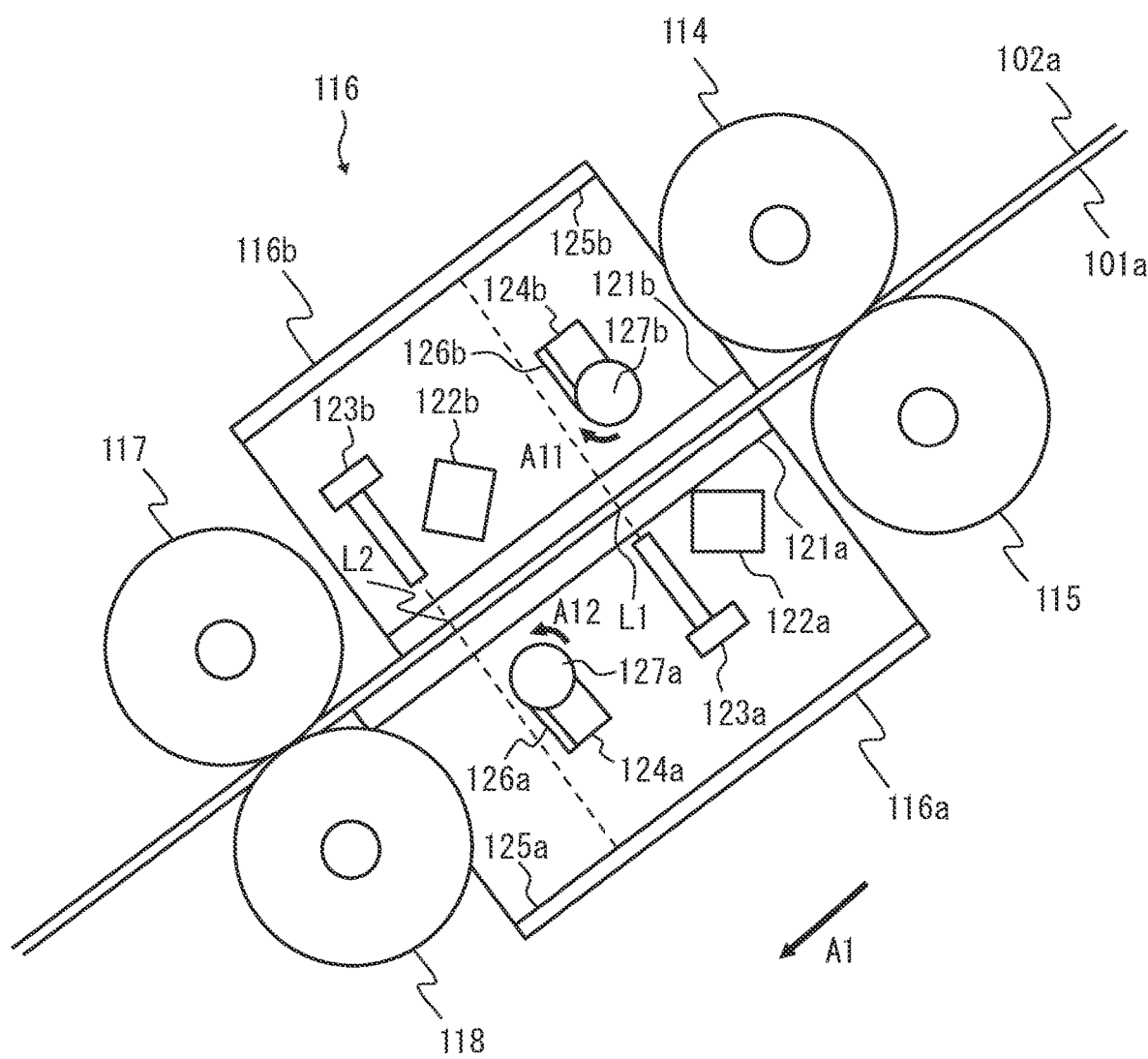
FIG. 4 is a schematic diagram for illustrating the imaging unit 116.

FIGS. 3 and 4 are schematic diagrams for illustrating the imaging unit 116.

As shown in FIGS. 3 and 4, the first imaging unit 116a is provided with a first light transmitting member 121a, a first light source 122a, a first imaging sensor 123a, a first backing member 124a and a first wall member 125a, etc. The second imaging unit 116b is provided with a second light transmitting member 121b, a second light source 122b, a second imaging sensor 123b, a second backing member 124b and a second wall member 125b, etc.

The first light transmitting member 121a and the second light transmitting member 121b are formed of transparent glass. The first light transmitting member 121a and the second light transmitting member 121b may be formed of transparent plastic, etc. The first light transmitting member 121a and the second light transmitting member 121b form the medium conveying surface.

The first light source 122a is provided on the opposite side of the second backing member 124b with the first light transmitting member 121a and the second light transmitting member 121b in between. The first light source 122a includes a light emitting diode (LED). The first light source 122a emits light toward a front surface of the medium conveyed to the position of the imaging unit 116, i.e., toward the second backing member 124b or the second wall member 125b of the second imaging unit 116b which faces the first light source 122a when the medium is not conveyed.

Similarly, the second light source 122b is provided on the opposite side of the first backing member 124a with the second light transmitting member 121b and the first light transmitting member 121a in between. The second light source 122b includes an LED. The second light source 122b emits light toward a back surface of the medium conveyed to the position of the imaging unit 116, i.e., toward the first backing member 124a or the first wall member 125a of the first imaging unit 116a facing the second light source 122b when the medium is not conveyed.

The first imaging sensor 123a is an example of an imaging sensor, and is provided on the opposite side of the second backing member 124b with the first light transmitting member 121a and the second light transmitting member 121b in between. The first imaging sensor 123a includes a line sensor based on a unity-magnification optical system type contact image sensor (CIS) including an imaging element based on a complementary metal oxide semiconductor (CMOS) linearly located in a main scanning direction. Further, the first imaging sensor 123a includes a lens for forming an image on the imaging element, and an A/D converter for amplifying and analog-digital (A/D) converting an electric signal output from the imaging element. The first imaging sensor 123a generates and outputs an input image acquired by imaging the front surface of the medium conveyed by the conveying roller and the periphery of the medium at an imaging position L1. When a medium is not conveyed, the first imaging sensor 123a generates and outputs a reference image acquired by imaging the second backing member 124b.

Similarly, the second imaging sensor 123b is provided on the opposite side of the first backing member 124a with the first light transmitting member 121a and the second light transmitting member 121b in between. The second imaging sensor 123b includes a line sensor based on a unity-magnification optical system type CIS including an imaging element based on a CMOS linearly located in a main scanning direction. Further, the second imaging sensor 123b includes a lens for forming an image on the imaging element, and an A/D converter for amplifying and A/D converting an electric signal output from the imaging element. The second imaging sensor 123b generates and outputs an input image acquired by imaging the back surface of the medium conveyed by the conveying roller and the periphery of the medium at an imaging position L2. When a medium is not conveyed, the second imaging sensor 123b generates and outputs a reference image acquired by imaging the first backing member 124a.

A line sensor based on a unity-magnification optical system type CIS including an imaging element based on charge coupled devices (CCDs) may be used in place of the line sensor based on a unity-magnification optical system type CIS including an imaging element based on a CMOS. Further, a line sensor based on a reduction optical system type line sensor including an imaging element based on CMOS or CCDs. In addition, a set of the second light source 122b, the second imaging sensor 123b, the first backing member 124a and the first wall member 125a may be omitted.

The first backing member 124a is provided below the first light transmitting member 121a and at a position facing the second light source 122b and the second imaging sensor 123b. The first backing member 124a includes a first facing surface 126a facing the second imaging sensor 123b. The first facing surface 126a has, for example, white, and functions as a white reference member for correcting an image such as shading based on an image signal in which the first facing surface 126a is imaged. The first facing surface 126a has a color other than black. The first facing surface 131a may have a color other than white. The first backing member 124a is supported rotatably about a first rotation shaft 127a, and is rotated by a driving force from a first motor which will be described later. The first backing member 124a is provided in such a way that the first facing surface 126a is rotatable between a facing position (a position shown in FIG. 3) at which the first facing surface 126a faces the second imaging sensor 123b, and a non-facing position (a position shown in FIG. 4) at which the first facing surface 126a deviates from the facing position.

The second backing member 124b is an example of a reference member, and is provided above the second light transmitting member 121b at a position facing the first light source 122a and the first imaging sensor 123a. The second backing member 124b includes a second facing surface 126b facing the first imaging sensor 123a. The second facing surface 126b is an example of a facing surface, for example, has a white, and functions as a white reference member for correcting an image such as shading based on an image signal in which the second facing surface 126b is imaged. The second facing surface 126b has a color other than black. The second facing surface 126b may have a color other than white. The second backing member 124b is rotatably supported about the second rotation shaft 127b, and is rotated by the driving force from the first motor. The second backing member 124b is provided in such a way that the second facing surface 126b is rotatable between a facing position (a position shown in FIG. 3) at which the second facing surface 126b faces the first imaging sensor 123a, and a non-facing position (a position shown in FIG. 4) at which the second facing surface 126b deviates from the facing position.

The first wall member 125a is provided at a position facing the second imaging sensor 123b when the first backing member 124a is located at the non-facing position. The surface of the first wall member 125a facing the second imaging sensor 123b has a color different from the first opposing surface 126a such as black.

Similarly, the second wall member 125b is provided at a position facing the first imaging sensor 123a when the second backing member 124b is located at a non-facing position. The surface of the second wall member 125b facing the first imaging sensor 123a has a color different from the second facing surface 126b such as black.

Hereinafter, the first light transmitting member 121a and the second light transmitting member 121b may be collectively referred to as light transmitting members 121. The first light source 122a and the second light source 122b may be collectively referred to as light sources 122. The first imaging sensor 123a and the second imaging sensor 123b may be collectively referred to as imaging sensors 123. The first backing member 124a and the second backing member 124b may be collectively referred to as backing members 124. The first wall member 125a and the second wall member 125b may be collectively referred to as wall members 125. The first facing surface 126a and the second facing surface 126b may be collectively referred to as facing surfaces 126.

When the backing member 124 is located at the opposing position as shown in FIG. 3, the light emitted from the light source 122 is reflected by the facing surface 126 of the backing member 124 to image the imaging sensor 123, in the region where the medium is not present. In the image based on the image signal generated at this time, the pixel corresponding to the region where the medium is not present has a white color. On the other hand, when the backing member 124 is located at a non-facing position as shown in FIG. 4, the light emitted from the light source 122 is reflected by the wall member 125, and images the imaging sensor 123. In the image based on the image signal generated at this time, the pixel corresponding to the region where the medium is not present has a black color.

FIGS. 5A, 5B are schematic diagrams for illustrating a second backing member 124b. FIG. 5A is a perspective view of the second backing member 124b, and FIG. 5B is an exploded view of the second backing member 124b.

As shown in FIGS. 5A, 5B, the second backing member 124b includes a plate member 131, a sheet member 132, a second support member 133, a second cam member 134, a spring member 135 and a third support member 136, etc.

A cross section of the plate member 131 viewed from the width direction A2 has a concave. The plate member 131 is a plate-shaped member provided so as to extend along the width direction A2.

One surface of the sheet member 132 includes the second facing surface 126b. The other surface of the sheet member 132 is a seal including an adhesive surface. The sheet member 132 is provided so as to extend along the width direction A2. The second facing surface 126b is provided on a bottom surface of the plate member 131, by the adhesive surface of the sheet member 132 adhered to the bottom surface of the plate member 131.

The second support member 133 is attached to one end of the plate member 131 in the width direction A2, to rotatably support the plate member 131. Thus, the second support member 133 rotatably supports the second backing member 124b.

The second cam member 134 is provided so as to rotate by the driving force from the first motor which will be described later. The second cam member 134 is attached to the second support member 133 so that the second support member 133 rotates according to rotation of the second cam member 134. The second support member 133 and the second cam member 134 are an example of a support portion.

A spring member 135 is a helical torsion spring, etc. One end of the spring member 135 is attached to the upper housing 102 and the other end of the spring member 135 is attached to the second cam member 134. The spring member 135 applies a force for rotating in a direction opposite to a direction rotated by the driving force from the first motor, to the second cam member 134.

The third support member 136 is an example of a second support portion. The third support member 136 is attached to an end opposite to the second support member 133 in the width direction A2 of the plate member 131, to support the plate member 131.

FIG. 6 is a schematic diagram for illustrating the plate member 131 and the second support member 133. FIG. 6 is a perspective view of the plate member 131 and the second support member 133, viewed from the second support member 133 side.

As shown in FIG. 6, the plate member 131 includes a first recess 131a and a first hole 131b. On the other hand, the second support member 133 includes a first protrusion 133a, a first claw 133b and a first shaft 133c. The second support member 133 is positioned with respect to the plate member 131, by fitting the first protrusion 133a into the first recess 131a, and the second support member 133 is attached to the plate member 131, by engaging the first claw 133b with the first hole 131b. A shaft of a second cam member 134, which will be described later, is fitted to the first shaft 133c.

Figure 7:
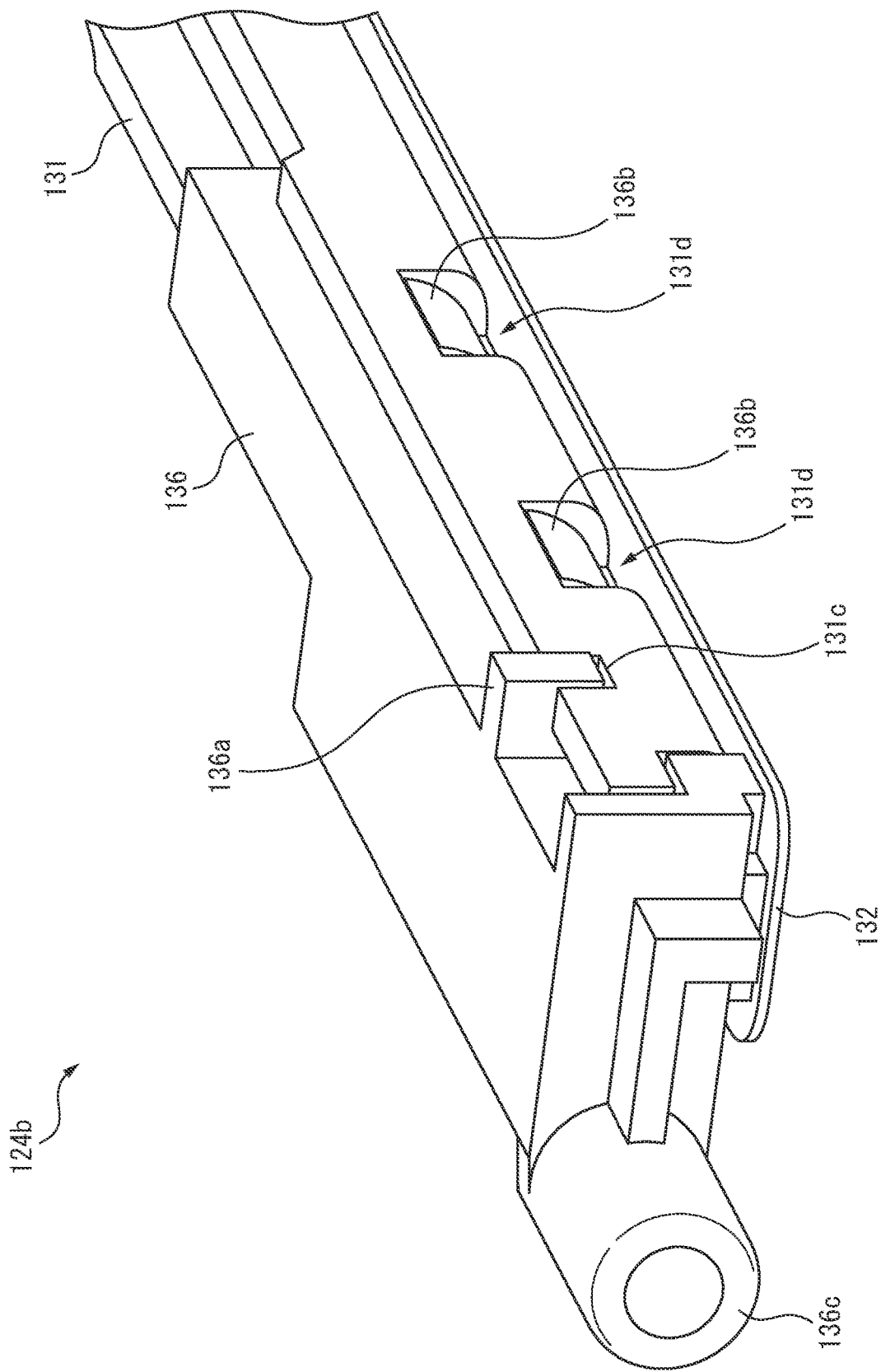
FIG. 7 is a schematic diagram for illustrating a third support member 136, etc.

FIG. 7 is a schematic diagram for illustrating the plate member 131 and the third support member 136. FIG. 7 is a perspective view of the plate member 131 and the third support member 136, viewed from the third support member 136 side.

As shown in FIG. 7, the plate member 131 further includes a second recess 131c and a second hole 131d. On the other hand, the third support member 136 includes a second protrusion 136a, a second claw 136b and a second shaft 136c. The third support member 136 is positioned with respect to the plate member 131 by fitting the second protrusion 136a into the second recess 131c, and the third support member 136 is attached to the plate member 131 by engaging the second claw 136b with the second hole 131d. The second shaft 136c is provided coaxially with the first shaft 133c of the second support member 133, and is engaged with a hole formed in an end on the third support member 136 side of the second imaging unit 116b in the width direction A2.

Figure 9:
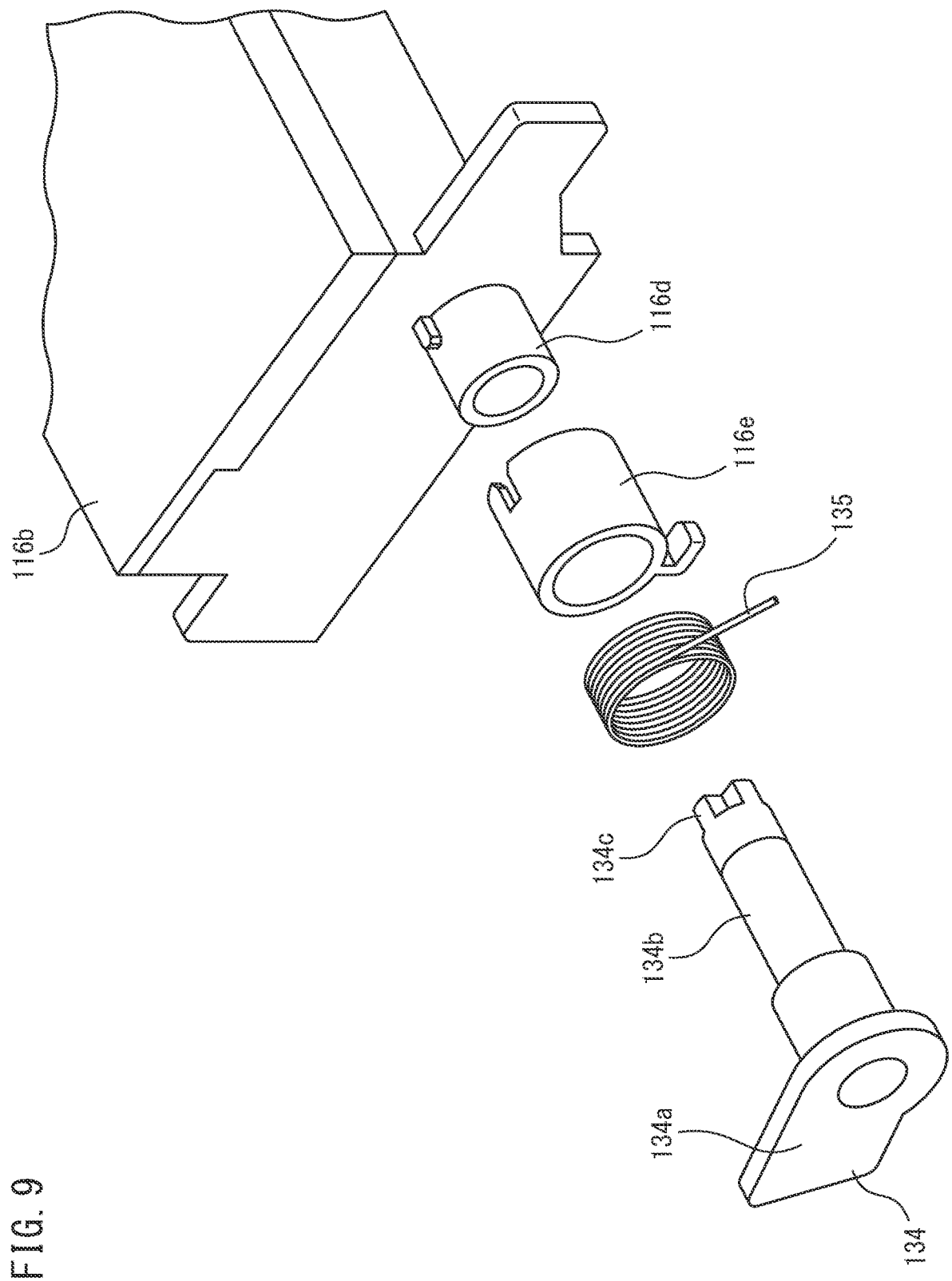
FIG. 9 is a schematic diagram for illustrating the second cam member 134, etc.

FIGS. 8 and 9 are schematic diagrams for illustrating the second imaging unit 116b and the second cam member 134. FIG. 8 is a perspective view of the second imaging unit 116b and the second cam member 134, viewed from the second support member 133 side. FIG. 9 is an exploded view of the second imaging unit 116b and the second cam member 134.

As shown in FIGS. 8 and 9, the second imaging unit 116b includes a protrusion 116d and a first engaging member 116e, etc.

The protrusion 116d is provided at one end of the second imaging unit 116b in the width direction A2, i.e., at an end on the second support member 133 side. A through hole penetrating a wall portion of the second imaging unit 116b in the width direction A2 is formed inside the protrusion 116d. The second support member 133 is located so that the first shaft 133c faces the through hole of the protrusion 116d.

The first engaging member 116e is an example of a first engaging portion and an engaging portion. The first engaging member 116e is formed of a member having high slidability such as a plastic member, and is engaged with an outer peripheral surface of the protrusion 116d so as to cover the protrusion 116d. The first engaging member 116e is provided so as to slide with respect to a first guide member, which will be described later. Since the first engaging member 116e is formed of a member separate from the second imaging unit 116b, the medium conveying apparatus 100 can be recovered inexpensively by component replacement even when the first engaging member 116e is damaged by frictional with the first guide member. The first engaging member 116e may be formed of a member integral with the second imaging unit 116b.

The second cam member 134 includes a rotating portion 134a, a third shaft 134b and a fitting portion 134c, etc. The rotating portion 134a is attached to one end (outer end) of the third shaft 134b in the width direction A2, and is provided so as to rotate about the third shaft 134b. The fitting portion 134c is formed at the other end (inner end) of the third shaft 134b in the width direction A2, and has a shape fitting with the first shaft 133c of the second support member 133. The fitting portion 134c is fitted to the first shaft 133c of the second support member 133 through the inside of the first engaging member 116e and the protrusion 116d. Thus, the third shaft 134b of the second cam member 134 is located inside the first engaging member 116e, and the second backing member 124b is provided to rotate according to the rotation of the second cam member 134.

Figure 10:
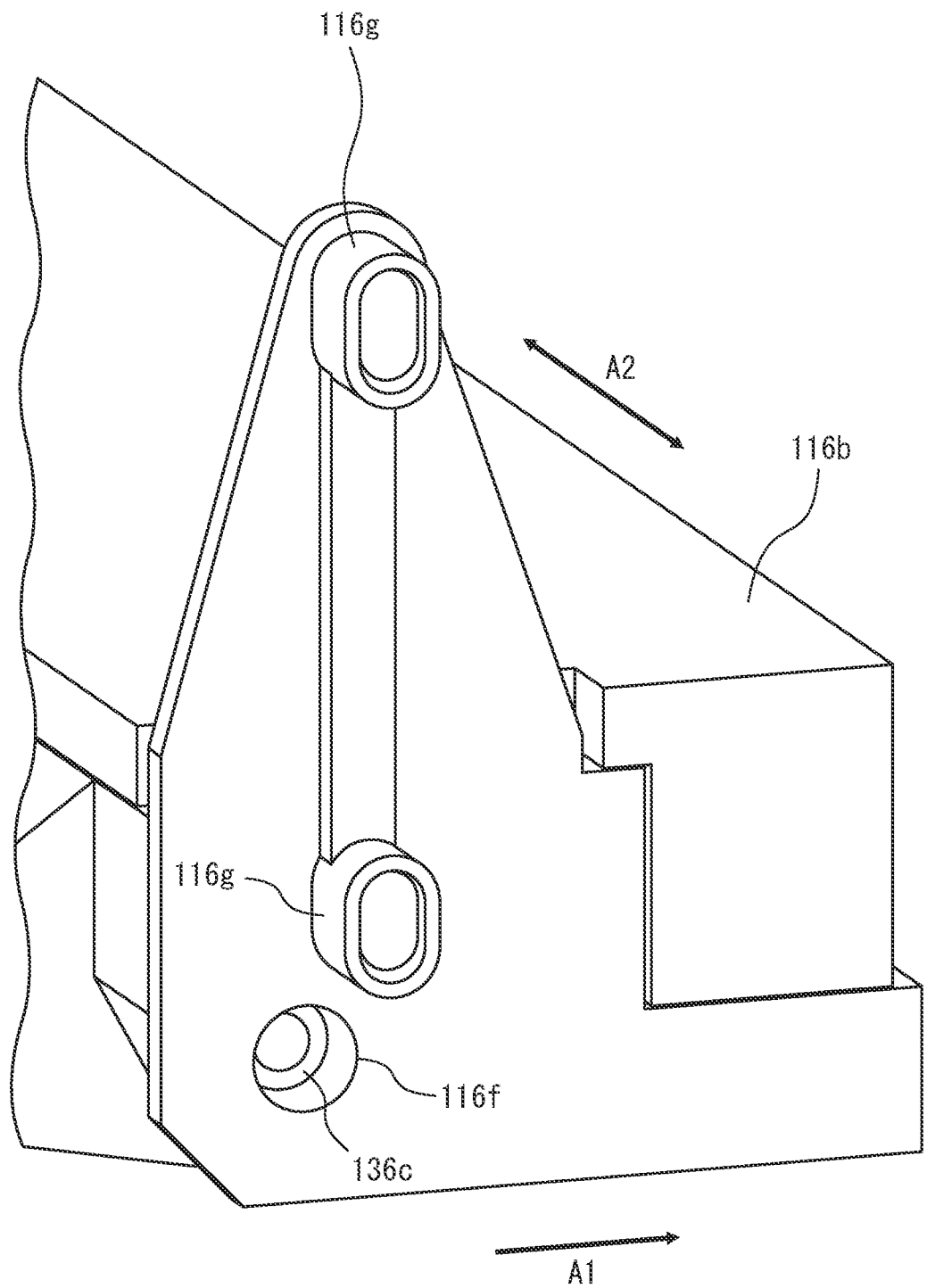
FIG. 10 is a schematic diagram for illustrating a second imaging unit 116b, etc.

FIG. 10 is a schematic diagram for illustrating the second imaging unit 116b and the third support member 136. FIG. 10 is a perspective view of the second imaging unit 116b, viewed from the third support member 136 side.

As shown in FIG. 10, the second imaging unit 116b further includes a third hole 116f and a second engaging member 116g, etc.

The third hole 116f is provided at an end opposite to an end on the second support member 133 side of the second imaging unit 116b in the width direction A2, i.e., at an end on the third support member 136 side. The second imaging unit 116b rotatably supports the third support member 136, by the second shaft 136c of the third support member 136 engaging with the third hole 116f.

The second engaging member 116g is an example of a second engaging portion. The second engaging member 116g is a boss having a rectangular shape with rounded corners. Since the second engaging member 116g has a rectangular shape, it can suppress the occurrence of folding. The second engaging member 116g may have a circular shape. The second engaging member 116g is formed of a member having high slidability such as a plastic member. The second engaging member 116g is provided at an end opposite to an end on the second support member 133 side of the second imaging unit 116b in the width direction A2, i.e., at an end on the third support member 136 side. That is, the first engaging member 116e is provided at one end in the width direction A2 perpendicular to the medium conveying direction of the second imaging unit 116b, and the second engaging member 116g is provided at the other end in the width direction A2 perpendicular to the medium conveying direction of the second imaging unit 116b.

In the example shown in FIG. 10, two second engaging members 116g are located apart from each other along in the height direction A3 perpendicular to the medium conveying surface. A distance between an upper end of the second engaging member 116g located on the upper side and a lower end of the second engaging member 116g located on the lower side is set to be larger than a distance between an upper end and a lower end of the first engaging member 116e. As the second engaging member, only one second engaging member may be located. In this case, a distance between an upper end and a lower end of the one second engaging member is set to be larger than the distance between the upper end and the lower end of the first engaging member 116e. Further, as the second engaging member, three or more second engaging members may be located. In this case, a distance between an upper end of the second engaging member located on the uppermost side and a lower end of the second engaging member located on the lowermost side is set to be larger than the distance between the upper end and the lower end of the first engaging member 116e.

The second engaging member 116g is provided so as to slide with respect to a second guide member, which will be described later. Since the second engaging member 116g is formed of a member separate from the second imaging unit 116b, the medium conveying apparatus 100 can be recovered inexpensively by component replacement even when the second engaging member 116g is damaged by frictional with the second guide member. The second engaging member 116g may be formed of a member integral with the second imaging unit 116b.

FIG. 11 is a schematic diagram for illustrating a second imaging unit 116b. FIG. 11 is a perspective view of the entire second imaging unit 116b.

As shown in FIG. 11, the second imaging unit 116b further includes an elastic member 116h. The elastic member 116h is a spring member such as a compression coil spring, and is provided so that one end of the elastic member 116h is attached to an upper surface of the second imaging unit 116b and the other end of the elastic member 116h is supported by the upper housing 102. The second imaging unit 116b is urged in a direction toward the first imaging unit 116a side by the elastic member 116h. The elastic member 116h may be another spring member such as a leaf spring or a rubber member.

The second imaging unit 116b has a so-called auto-gap mechanism, which moves in the height direction A3 by a thickness of the conveyed medium. The second imaging unit 116b is located so that a distance between the second imaging unit 116b and the first imaging unit 116a is sufficiently small by the elastic member 116h. Thus, when a thin medium such as a PPC paper or a thin paper is conveyed, a distance from the medium to the imaging sensor 123 is constant at the imaging position. Therefore, even when unity-magnification optical system type CIS having a shallow depth of field is used, the occurrence of defocus is suppressed, and the imaging sensor 123 can acquire a stable image. On the other hand, when a medium thicker than the distance between the second imaging unit 116b and the first imaging unit 116a, such as a cardboard, a brochure, or a passport, is conveyed, the second imaging unit 116b is pushed up by the thickness of the medium. Therefore, the thick medium is guided well between the first imaging unit 116a and the second imaging unit 116b.

As shown in FIG. 11, the first engaging member 116e is located on the upstream side of a center position P3 of a downstream end P1 and an upstream end P2 of the second imaging unit 116b in the medium conveying direction A1. That is, the first engaging member 116e is located at a position closer to the upstream end P2 than the downstream end P1 of the second imaging unit 116b in the medium conveying direction A1.

In the medium conveying apparatus 100, when a thick medium is conveyed at a high speed, the medium violently collides with the imaging unit guide 116c, and applies an impact force toward the downstream side in the medium conveying direction A1 to the second imaging unit 116b. By the impact force by the medium, the second imaging unit 116b is applied with a swinging force for swinging toward the downstream side and the downward side about the arrangement position of the first engaging member 116e supported by the upper housing 102. As described above, the second imaging unit 116b is pushed up by the thickness of the medium. Thus, so-called twisting force for rotating while rising occurs in the second imaging unit 116b by the swing force. By the twisting force, the first engaging member 116e is caught by the first guide member, and the smooth ascent of the second imaging unit 116b is inhibited, and thereby, the conveyance load of the medium increases.

In the medium conveying apparatus 100, the first engaging member 116e is located on the upstream side. Thus, when the impact force is applied to the second imaging unit 116b by the thick medium conveyed at high speed, the rotational moment applied to the second imaging unit 116b is reduced (a swing radius of the second imaging unit 116b is reduced). Since the swinging force applied to the second imaging unit 116b is reduced, and the twisting force with respect to the rise of the second imaging unit 116b is reduced. Accordingly, the medium conveyance apparatus 100 can smoothly raise the first engaging member 116e along the first guide member, and suppress an increase in the conveyance load of the medium. Therefore, the medium conveying apparatus 100 can satisfactorily convey the thick medium at a high speed. The medium conveying apparatus 100 can suppress the occurrence of a jam of the medium or an extension of the medium in the input image, by suppressing the increase in the conveyance load of the medium. The medium conveying apparatus 100 can suppress an increase in the conveying torque, and thereby, suppress an increase in the power consumption, by suppressing the increase in the conveying load of the medium.

The first engaging member 116e may be located on the upstream side of the position of the center of gravity of the second imaging unit 116b in the medium conveying direction A1. Even in that case, the medium conveying apparatus 100 can satisfactorily convey the thick medium at a high speed.

Figure 12:
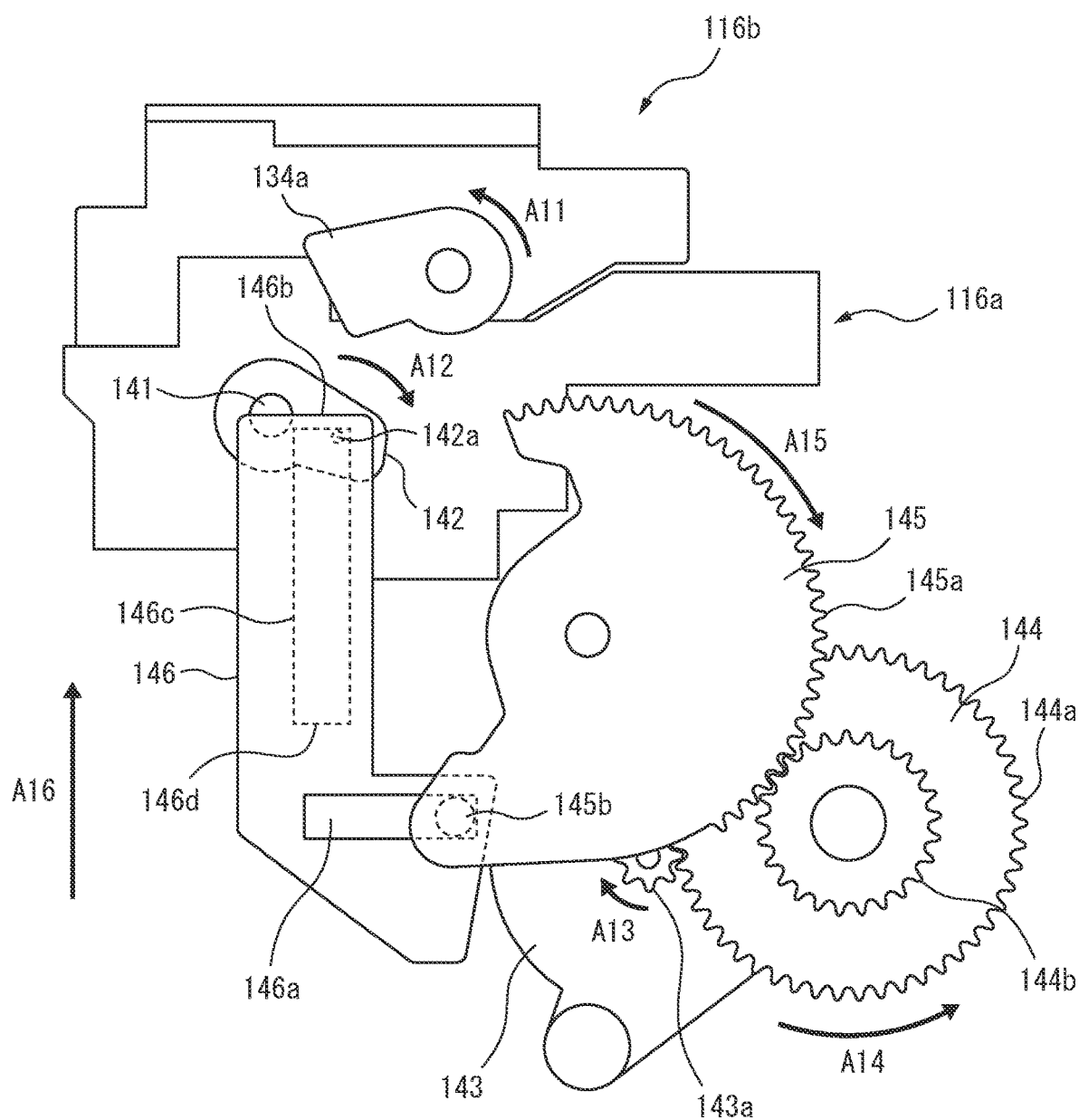
FIG. 12 is a schematic diagram for illustrating an operation of the second cam member 134.
Figure 13:
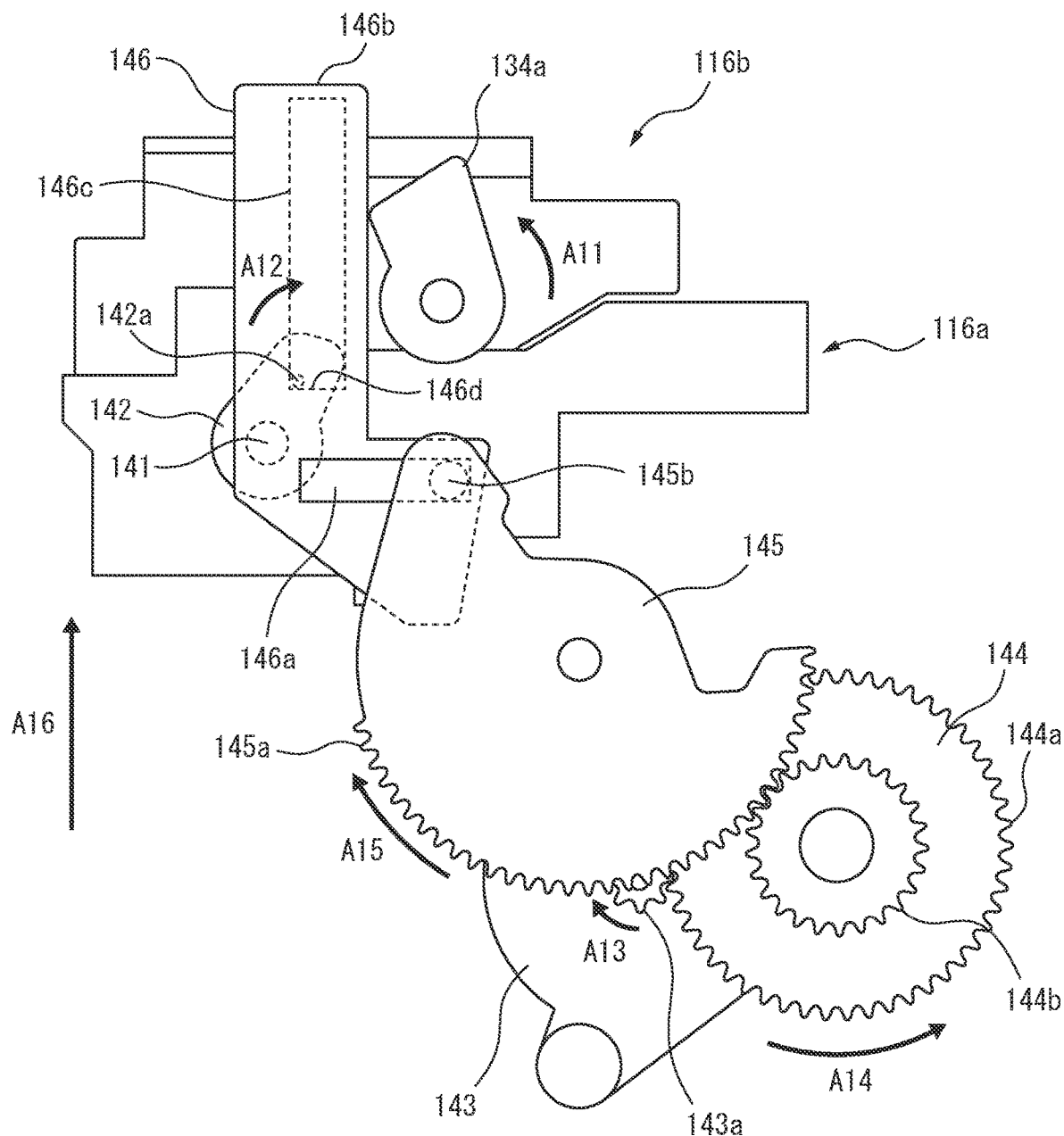
FIG. 13 is a schematic diagram for illustrating the operation of the second cam member 134.

FIGS. 12 and 13 are schematic diagrams for illustrating an operation of the second cam member 134. FIGS. 12 and 13 are schematic diagrams of the periphery of the imaging unit 116, viewed from the side. FIG. 12 shows the imaging unit 116 in a state in which the backing member 124 is located at the facing position. FIG. 13 shows the imaging unit 116 in a state in which the backing member 124 is located at the non-facing position.

As shown in FIGS. 12 and 13, the medium conveying apparatus 100 further includes a first support member 141, a first cam member 142, a first motor 143, a gear 144, a third cam member 145 and an arm member 146, etc.

The first support member 141 is attached to one end of the first backing member 124a in the width direction A2 (an end on the second support member 133 side), to rotatably support the first backing member 124a.

The first cam member 142 is provided to rotate by a driving force from the first motor 143. The first cam member 142 is attached to the first support member 141 so that the first support member 141 rotates according to the rotation of the first cam member 142. The first cam member 142 includes a protrusion 142a to engage with the arm member 146.

The first motor 143 rotates in accordance with a control signal from a processing circuit, which will be described later, and generates the driving force for rotating the first backing member 124a and the second backing member 124b to locate them at the non-facing position.

The gear 144 includes a first gear portion 144a to mesh with a gear portion 143a provided on a rotation shaft of the first motor 143, and a second gear portion 144b to mesh with the third cam member 145, to rotate according to the driving force from the first motor 143.

The third cam member 145 includes a gear portion 145a to mesh with the second gear portion 144b of the gear 144, to rotate according to the rotation of the gear 144. Further, the third cam member 145 includes a protrusion 145b to engage with the arm member 146, to slide the arm member 146 in the height direction A3, by rotating according to the rotation of the gear 144.

The arm member 146 includes a rail portion 146a extending along the medium conveying direction A1 to engage with the protrusion 145b of the third cam member 145, to slide in the height direction A3 according to the rotation of the third cam member 145. The arm member 146 includes an upper surface portion 146b and a bottom surface portion 146d provided in the recess 146c extending along the height direction A3. The upper surface portion 146b rises according to the rising of the arm member 146, and abuts the rotating portion 134a of the second cam member 134, to rotate the second cam member 134. The bottom surface portion 146d rises according to the rising of the arm member 146, and abuts the protrusion 142a of the first cam member 142, to rotate the first cam member 142.

In the state shown in FIG. 12, the rotating portion 134a of the second cam member 134 is not in contact with the arm member 146, and is urged in a direction of an arrow A11 by the spring member 135. Further, the protrusion 142a of the first cam member 142 is not in contact with the bottom surface portion 146d of the arm member 146, and is urged in a direction of an arrow A12 by the same spring member as the spring member 135. In this state, the first backing member 124a and the second backing member 124b are located at the facing position shown in FIG. 3.

On the other hand, as shown in FIG. 13, when the first motor 143 generates the driving force, and the rotation axis of the first motor 143 rotates in a direction of an arrow A13, the gear 144 rotates in a direction of an arrow A14, and the third cam member 145 rotates in a direction of an arrow A15. As a result, the protrusion 145b of the third cam member 145 moves toward the upper left side, and the arm member 146 moves in a direction of an arrow A16 (upward) so that the protrusion 145b can move leftward along the rail portion 146a. The upper surface portion 146b of the arm member 146 comes into contact with the rotating portion 134a of the second cam member 134, to rotate the second cam member 134 in a direction opposite to the arrow A11 against the urging force by the spring member 135. The bottom surface portion 146d of the arm member 146 comes into contact with the protrusion 142a of the first cam member 142, to rotate the first cam member 142 in a direction opposite to the arrow A12 against the urging force by the spring member. As a result, the first backing member 124a and the second backing member 124b are located at the non-facing position shown in FIG. 4.

Figure 14:
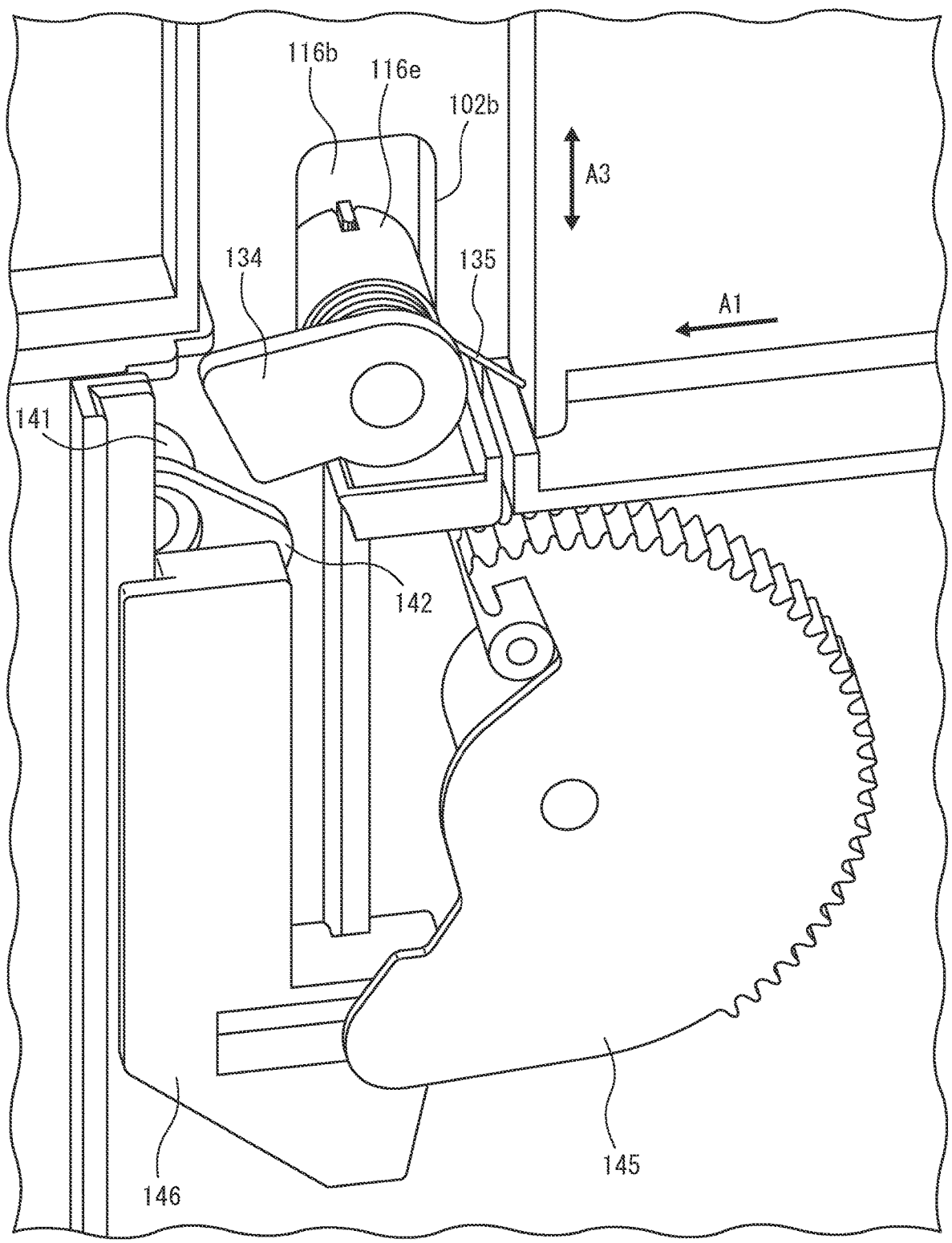
FIG. 14 is a schematic diagram for illustrating the first guide member 102b.

FIG. 14 is a schematic diagram for illustrating the first guide member 102b. FIG. 14 is a perspective view showing the periphery of the end on the first engaging member 116e side of the second imaging unit 116b.

As shown in FIG. 14, the upper housing 102 includes a first guide member 102b. The first guide member 102b is an example of a guide portion and a rail. The first guide member 102b is a rail formed so as to extend in the height direction A3 perpendicular to the medium conveying surface, at the end on the first engaging member 116e side in the width direction A2 of the medium conveyance path. The first engaging member 116e is engaged with the first guide member 102b so as to slide along the first guide member 102*b*. Thus, the first engaging member 116*e* is guided by the first guide member 102*b* along the height direction A3 perpendicular to the medium conveying surface. The first guide member 102*b* slidably guides the second imaging unit 116*b* in the height direction A3 perpendicular to the medium conveying surface so that the second imaging unit 116*b* moves in the height direction A3 perpendicular to the medium conveying surface. The second cam member 134 located inside the first engaging member 116*e* is located inside the first guide member 102*b*.

Figure 15:
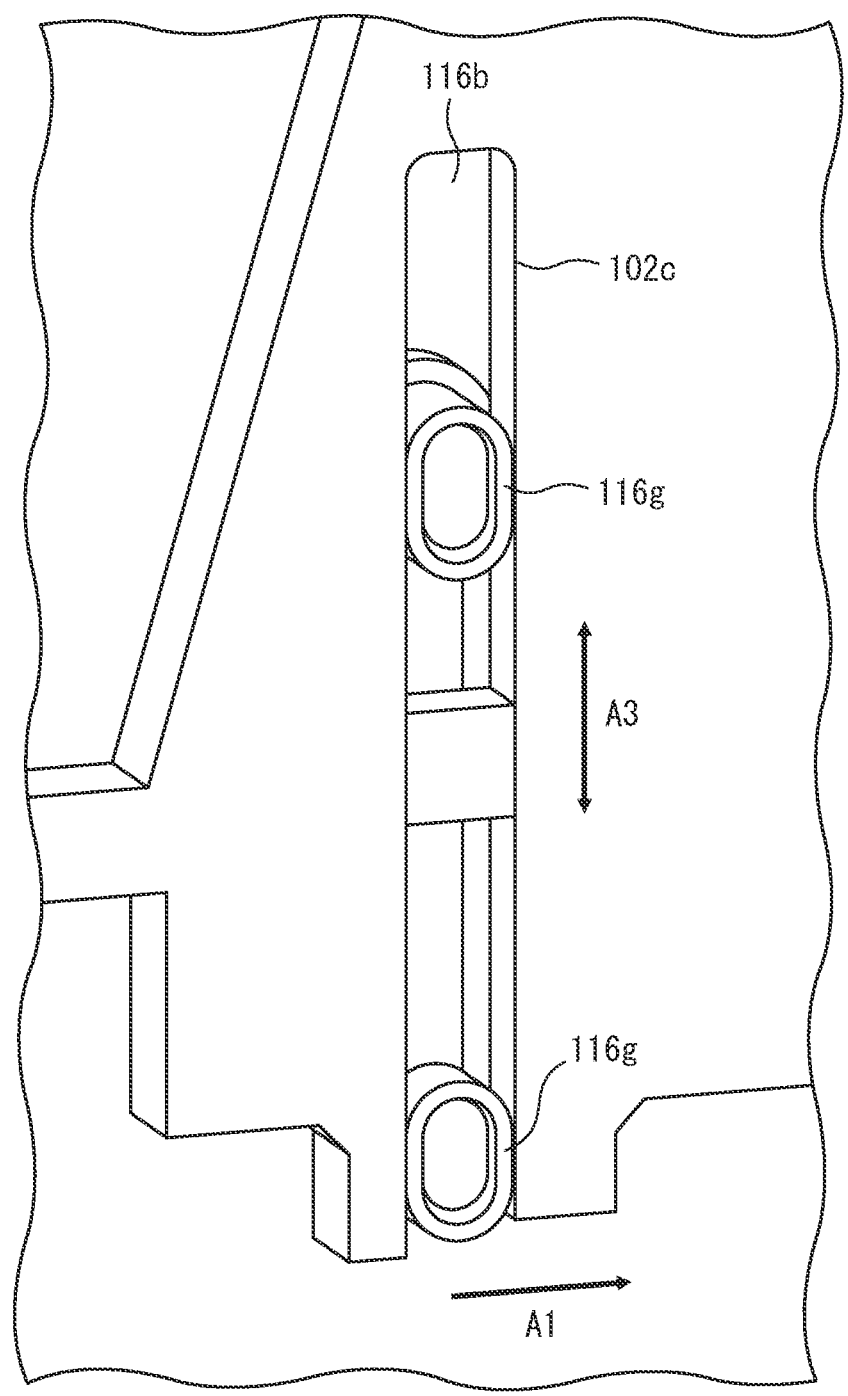
FIG. 15 is a schematic diagram for illustrating the second guide member 102c.

FIG. 15 is a schematic diagram for illustrating the second guide member 102*c*. FIG. 15 is a perspective view showing the periphery of the end on the second engaging member 116*g* side of the second imaging unit 116*b*.

As shown in FIG. 15, the upper housing 102 further includes a second guide member 102*c*. The second guide member 102*c* is an example of a second guide portion and a second rail. The second guide member 102*c* is a rail formed so as to extend in the height direction A3 perpendicular to the medium conveying surface, at the end on the second engaging member 116*g* side in the width direction A2 of the medium conveyance path. The second engaging member 116*g* is engaged with the second guide member 102*c* so as to slide along the second guide member 102*c*. As a result, the second guide member 102*c* slidably supports the second engaging member 116*g* in the height direction A3 perpendicular to the medium conveying surface. The second guide member 102*c* slidably guides the second imaging unit 116*b* in the height direction A3 perpendicular to the medium conveying surface so that the second imaging unit 116*b* moves in the height direction A3 perpendicular to the medium conveying surface. The third support member 136 being a rotation axis of the second backing member 124*b*, is not located inside the second engaging member 116*g* and the second guide member 102*c*. The third support member 136 may be located inside the second engaging member 116*g* and the second guide member 102*c*.

As described above, when the thick medium is conveyed, the second imaging unit 116*b* is pushed up by the thickness of the medium. Accordingly, the first engaging member 116*e* in which the second cam member 134 is located, slidably moves upward along the first guide member 102*b*. That is, the rotation fulcrum of the second backing member 124*b* is located inside the rail for sliding of the second imaging unit 116*b*.

If a rotation fulcrum of a backing member is located outside a rail for sliding of an imaging unit, the rotation fulcrum and the rail need to separate from each other so that the rotation fulcrum and the rail do not interfere with each other. In order to slide the imaging unit well, the rail is preferably located near the central position of the imaging unit in the medium conveying direction. In order for the backing member to rotate well, a support member and a cam member for rotating the backing member need to have a certain size. Therefore, the rotation fulcrum needs to be located at a position sufficiently away from the central position of the imaging unit, and the imaging unit needs to have a certain size so that the support member and the cam member, and the rail does not abut. However, when the size of the imaging unit increases, the apparatus size increases, the force required to push up the imaging unit increases, and thereby, the conveyance load during conveying the medium increases.

Since the rotation fulcrum of the second backing member 124*b* is located inside the rail for sliding of the second imaging unit 116*b*, the medium conveying apparatus 100 can reduce the size of the second imaging unit 116*b*. Thus, the medium conveying apparatus 100 can further reduce the apparatus size, suppress the increase in the conveyance load during conveying the medium, and thereby, satisfactorily convey the medium.

In order to stably slide the second imaging unit 116*b*, it is necessary to increase the size in the height direction A3 of the first engaging member 116*e* guided in contact with the first guide member 102*b*. However, the third shaft 134*b* of the second cam member 134 rotatably supporting the second backing member 124*b* has a cylindrical shape, and the first engaging member 116*e* covering the third shaft 134*b* has a cylindrical shape.

As described above, in the medium conveying apparatus 100, the second engaging member 116*g* located on the side opposite to the first engaging member 116*e* in the second imaging unit 116*b* is provided so as to slide along the second guide member 102*c*. The distance between the upper end and the lower end of the second engaging member 116*g* is set to be larger than the distance between the upper end and the lower end of the first engaging member 116*e*. Therefore, the medium conveying apparatus 100 can stably slide the second imaging unit 116*b* by the second engaging member 116*g* provided on the side opposite to the first engaging member 116*e* in the width direction A2.

In the medium conveying apparatus 100, only the length in the height direction A3 of the second engaging member 116*g* is made longer, and the length in the height direction A3 of the first engaging member 116*e* is made shorter, of two engaging members provided at both ends in the width direction A2 in the second imaging unit 116*b*. The medium conveying apparatus 100 can reduce the sliding load between the second imaging unit 116*b* and the respective guide members, by reducing the area in which the second imaging unit 116*b* is in contact with the respective guide members at both ends of the width direction A2. Therefore, the medium conveying apparatus 100 can reduce the sliding load between the second imaging unit 116*b* and the respective guide members even when the mold release twist or dimensional failure, etc., occurs in the resin molding of the second imaging unit 116*b*. Therefore, the medium conveying apparatus 100 can satisfactorily slide the second imaging unit 116*b*.

Figure 16:
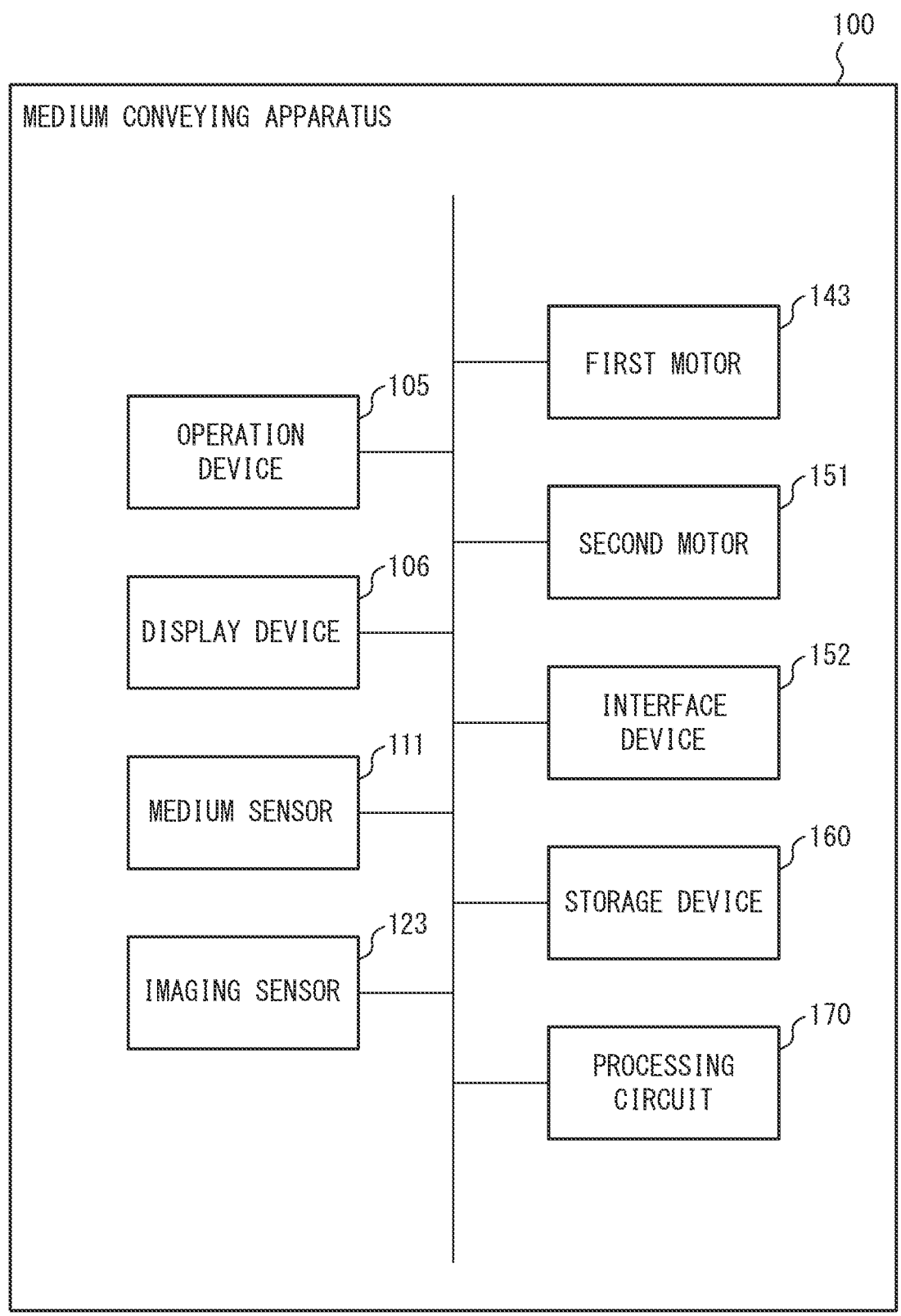
FIG. 16 is a block diagram illustrating a schematic configuration of the medium conveying apparatus 100.

FIG. 16 is a block diagram illustrating a schematic configuration of the medium conveying apparatus 100.

The medium conveying apparatus 100 further includes a second motor 151, an interface device 152, a storage device 160 and a processing circuit 170, etc., in addition to the configuration described above.

The second motor 151 includes one or more motors, and rotates the feed roller 112, the separation roller 113, the first conveyance roller 114, the second conveyance roller 115, the first ejection roller 117 and the second ejection roller 118, to convey the medium, by a control signal from the processing circuit 170. One roller of the first conveyance roller 114 and the second conveyance roller 115 may be a driven roller which is driven according to the rotation of the other roller. One roller of the first ejection roller 117 and the second ejection roller 118 may be a driven roller which is driven according to the rotation of the other roller.

For example, the interface device 152 includes an interface circuit conforming to a serial bus such as universal serial bus (USB), is electrically connected to an unillustrated information processing device (for example, a personal computer or a mobile information terminal), and transmits and receives an input image and various types of information. Further, a communication module including an antenna transmitting and receiving wireless signals, and a wireless communication interface device for transmitting and receiving signals through a wireless communication line in conformance with a predetermined communication protocol may be used in place of the interface device 152. For example, the predetermined communication protocol is a wireless local area network (LAN). The communication module may include a wired communication interface device for transmitting and receiving signals through a wired communication line in conformance with a communication protocol such as a wired LAN.

The storage device 160 includes a memory device such as a random access memory (RAM) or a read only memory (ROM), a fixed disk device such as a hard disk, or a portable storage device such as a flexible disk or an optical disk. Further, the storage device 160 stores a computer program, a database, a table, etc., used for various types of processing in the medium conveying apparatus 100. The computer program may be installed on the storage device 160 from a computer-readable, non-transitory medium such as a compact disc read only memory (CD-ROM), a digital versatile disc read only memory (DVD-ROM), etc., by using a well-known setup program, etc.

The processing circuit 170 operates in accordance with a program previously stored in the storage device 160. The processing circuit 170 is, for example, a central processing unit (CPU). The processing circuit 170 may be a digital signal processor (DSP), a large scale integration (LSI), an application specific integrated circuit (ASIC), a field-programmable gate array (FPGA), etc.

The processing circuit 170 is connected to the operation device 105, the display device 106, the medium sensor 111, the imaging sensor 123, the first motor 143, the second motor 151, the interface device 152 and the storage device 160, etc., and controls each of these units. The processing circuit 170 performs the drive control of the first motor 143 and the second motor 151 and the imaging control of the imaging sensor 123, etc., based on the medium signal received from the medium sensor 111, acquires the input image from the imaging sensor 123, and transmits it to the information processing apparatus via the interface device 152.

Figure 17:
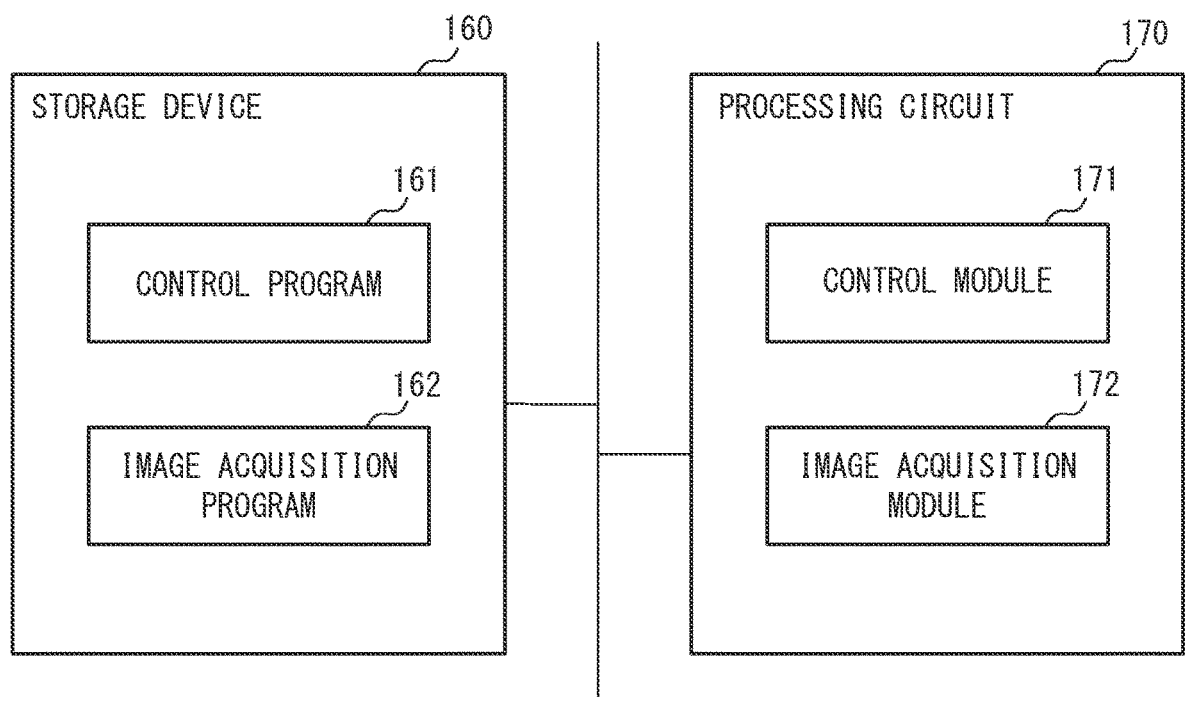
FIG. 17 is a diagram illustrating schematic configurations of a storage device 160 and a processing circuit 170.

FIG. 17 is a diagram illustrating schematic configurations of the storage device 160 and the processing circuit 170.

As shown in FIG. 17, a control program 161 and an image acquisition program 162, etc., are stored in the storage device 160. Each of these programs is a functional module implemented by software operating on a processor. The processing circuit 170 reads each program stored in the storage device 160 and operates in accordance with each read program. Thus, the processing circuit 170 functions as a control module 171 and an image acquisition module 172.

Figure 18:
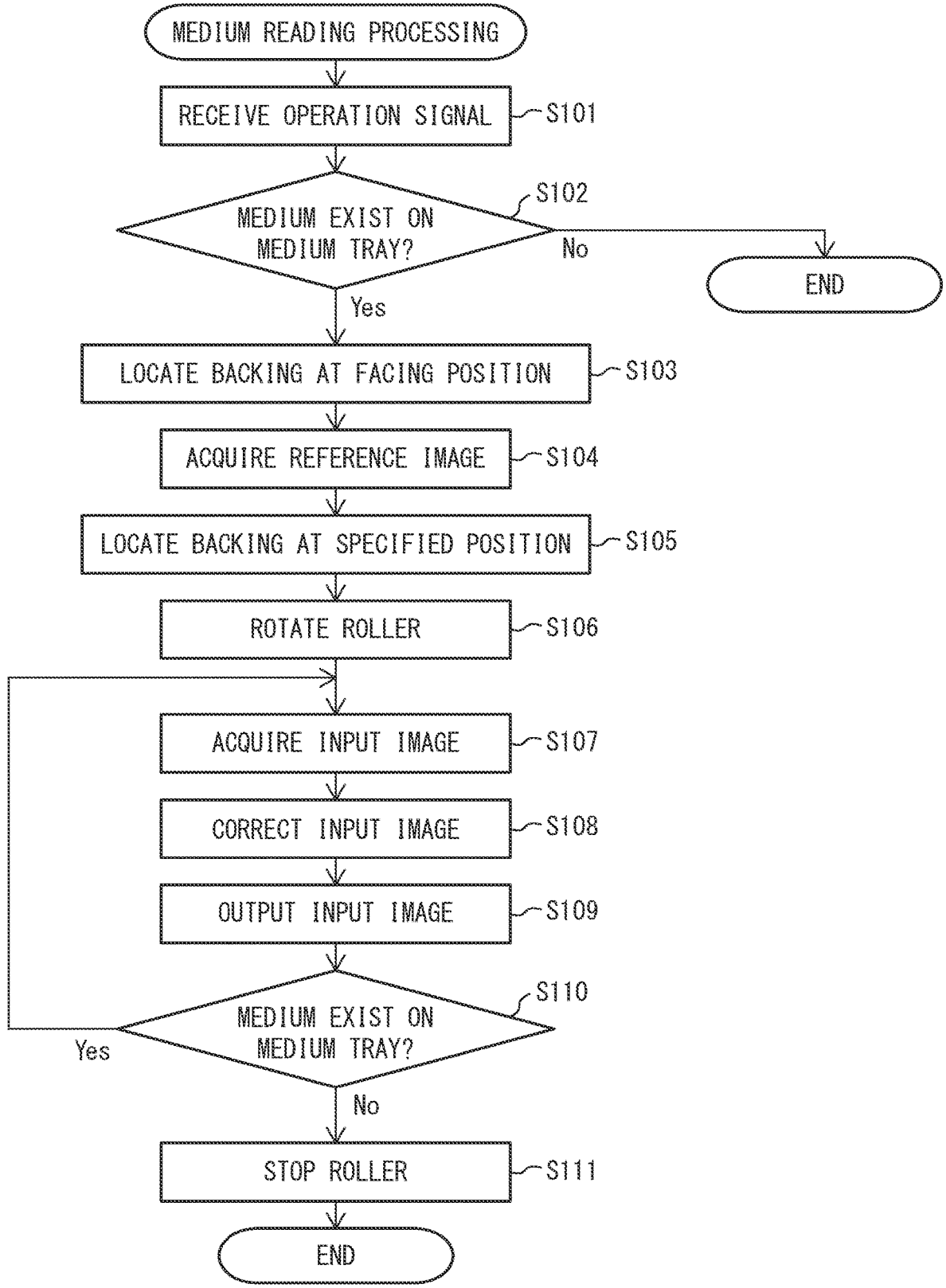
FIG. 18 is a flowchart illustrating an operation example of a medium reading process.

FIG. 18 is a flowchart illustrating an operation example of a medium reading process of the medium conveying apparatus 100.

Referring to the flowchart illustrated in FIG. 18, an operation example of the medium reading process in the medium conveying apparatus 100 will be described below. The operation flow described below is executed mainly by the processing circuit 170 in cooperation with each element in the medium conveying apparatus 100, in accordance with a program previously stored in the storage device 160.

First, the control module 171 stands by until an instruction to read a medium is input by the user by use of the operation device 105 or the information processing device, and an operation signal instructing to read the medium is received from the operation device 105 or the interface device 152 (step S101).

Next, the control module 171 acquires the medium signal from the medium sensor 111, and determines whether or not the medium is placed on the medium tray 103 based on the acquired medium signal (step S102). When the medium is not placed on the medium tray 103, the control module 171 ends a series of steps.

On the other hand, when the medium is placed on the medium tray 103, the control module 171 controls the first motor 143, to locate the backing members 124 at the facing positions (step S103).

Next, the image acquisition module 172 causes the imaging sensor 123 to image the backing members 124, to acquire the reference image from the imaging sensor 123 (step S104).

Next, the control module 171 controls the first motor 143, to locate the backing members 124 at specified positions specified by the user among the facing positions or non-facing positions (step S105). The specified position is specified by the user using the operation device 105 or the information processing apparatus before the medium reading process is executed, and is set in advance in the storage device 160. The medium conveying apparatus 100 can make a background in the input image white, and thereby, acquire an image in which the background is not conspicuous, by placing the backing members 124 at the facing positions. On the other hand, the medium conveying apparatus 100 can make the background in the input image black, and thereby, more accurately crop the medium having a white from the input image, by placing the backing members 124 at the non-facing positions.

Next, the control module 171 rotates the feed roller 112, the separation roller 113, the first conveyance roller 114, the second conveyance roller 115, the first ejection roller 117 and/or the second ejection roller 118 (step S106). The control module 171 drives the second motor 151 to rotate each roller and convey the medium.

Next, the image acquisition module 172 causes the imaging sensor 123 to image the medium, to acquire the input image from the imaging sensor 123 (step S107).

Next, the image acquisition module 172 corrects the acquired input image using the reference image acquired in step S104 (step S108). The image acquisition module 172 performs shading correction on the input image using the reference image, using a known image processing technique.

Next, the image acquisition module 172 outputs the corrected input image, by transmitting it to the information processing device via the interface device 152 (step S109).

Next, the control module 171 determines whether or not the medium remains on the medium tray 103, based on the medium signal received from the medium sensor 111 (step S110). When the medium remains on the medium tray 103, the control module 171 returns the process to step S107, repeats the processes of steps S107 to S110.

On the other hand, when the medium does not remain on the medium tray 103, the control module 171 stops the feed roller 112, the separation roller 113, the first conveyance roller 114, the second conveyance roller 115, the first ejection roller 117 and/or the second ejection roller 118 (step S111). The control module 171 controls the second motor 151 to stop each roller, and ends a series of steps.

As described in detail above, in the medium conveying apparatus 100, the rotation axis of the second backing member 124b is located inside the first engaging member 116e for sliding the second imaging unit 116b up and down. Thus, the medium conveying apparatus 100 can share the auto gap mechanism of the second imaging unit 116b and the rotation mechanism of the second backing member 124b.

Therefore, the medium conveying apparatus 100 in which the second backing member 124b is provided in the second imaging unit 116b movably located facing the first imaging sensor 123a, can further reduce the apparatus size.

Figure 19:
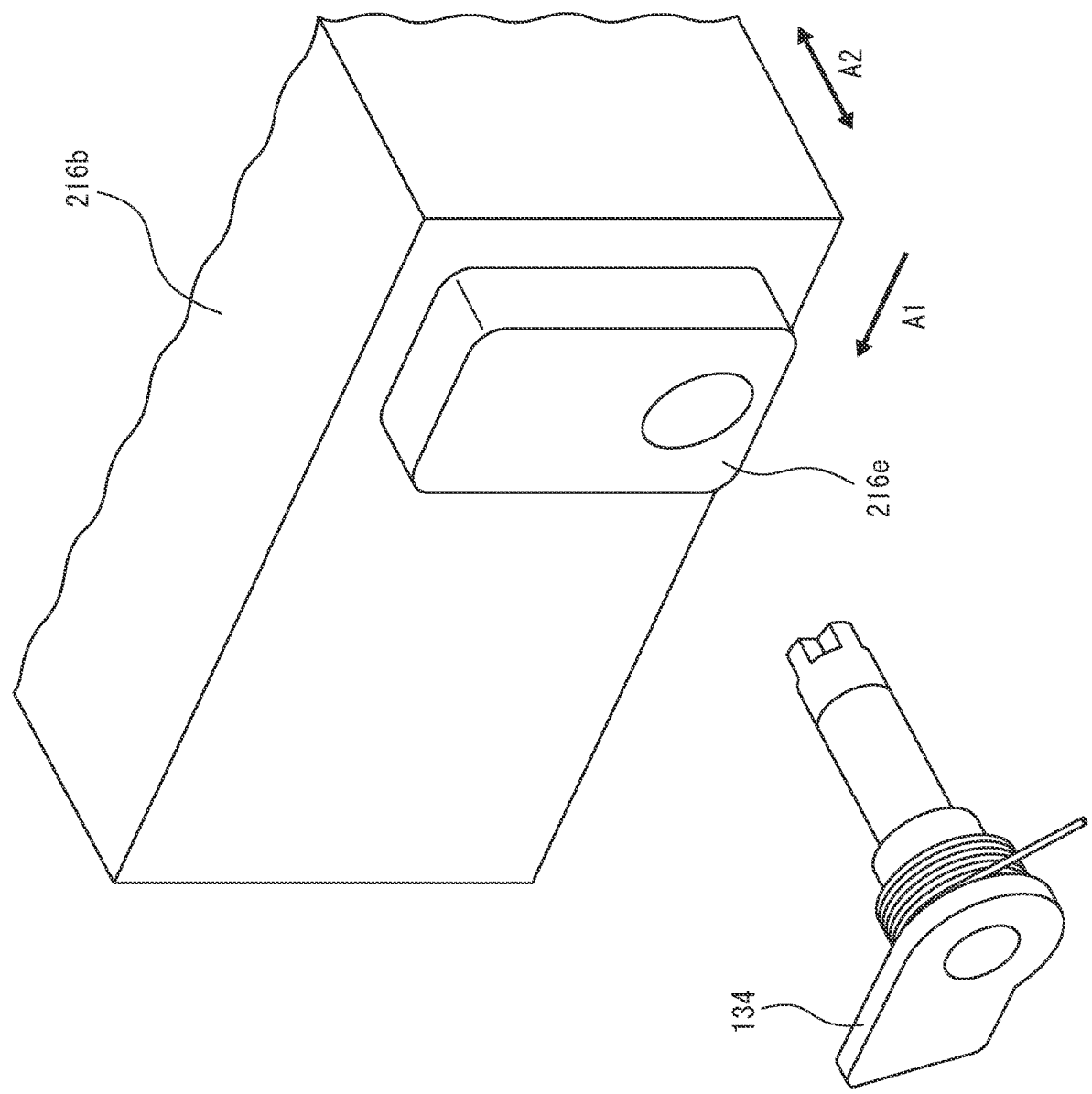
FIG. 19 is a schematic diagram for illustrating another second imaging unit 216b.

FIG. 19 is a schematic diagram for illustrating a second imaging unit 216b in a medium conveying apparatus according to another embodiment.

As shown in FIG. 19, the medium conveying apparatus according to the present embodiment includes a second imaging unit 216b, instead of the second imaging unit 116b.

The second imaging unit 216b has a configuration similar to the second imaging unit 116b. However, the second imaging unit 216b includes a first engaging member 216e, instead of the first engaging member 116e. The first engaging member 216e is an example of an engaging portion. Similarly to the first engaging member 116e, the first engaging member 216e is provided at one end in the width direction A2 of the second imaging unit 216b, to be guided by the first guide member 102b. The second cam member 134 is located inside first engaging member 216e. However, the first engaging member 216e is provided in such a way that a length in the height direction A3 perpendicular to the medium conveying surface is longer than a length in the medium conveying direction A1. Thus, the medium conveyance apparatus can stably slide the second imaging unit 216b by the first engaging member 216e.

In this case, the second engaging member provided on the side opposite to the first engaging member 216e in the second imaging unit 216b may have a cylindrical shape, i.e., may be provided so that the length in the height direction A3 is substantially the same as the length in the medium conveying direction A1. That is, the distance between the upper end and the lower end of the second engaging member may be set to be shorter than the distance between the upper end and the lower end of the first engaging member 216e. Thus, the medium conveying apparatus can reduce the sliding load between the second imaging unit 216b and the respective guide members, by reducing the area in which the second imaging unit 216b is in contact with the respective guide members at both ends of the width direction A2. Therefore, the medium conveying apparatus can satisfactorily slide the second imaging unit 216b.

As described in detail above, the medium conveying apparatus can further reduce the size of the apparatus even when the length in the height direction A3 of the first engaging member 216e is longer than the length in the medium conveying direction A1 of the first engaging member 216e.

Figure 20:
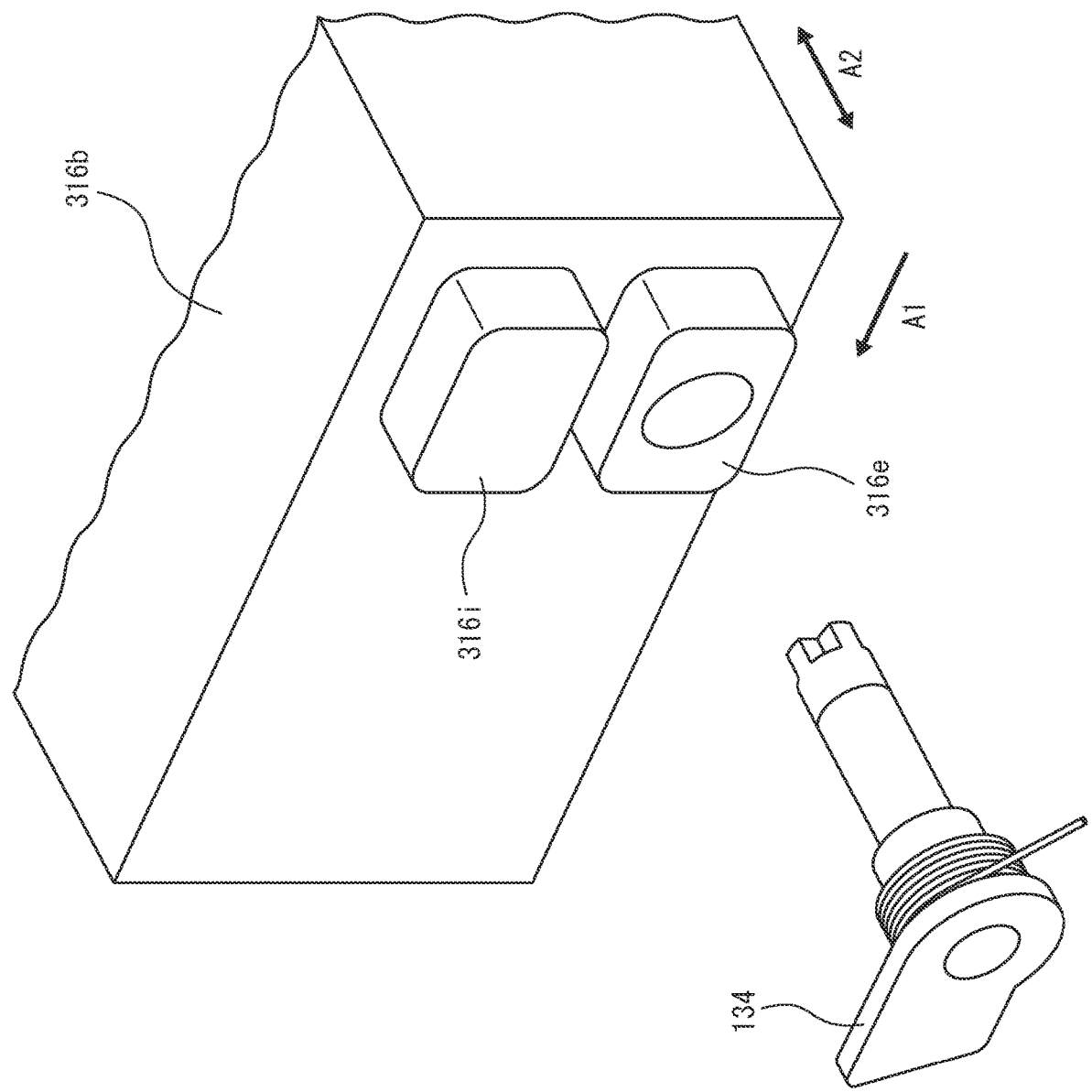
FIG. 20 is a schematic diagram for illustrating another second imaging unit 316b.

FIG. 20 is a schematic diagram for illustrating a second imaging unit 316b in a medium conveying apparatus according to still another embodiment.

As shown in FIG. 20, the medium conveying apparatus according to the present embodiment includes a second imaging unit 316b, instead of the second imaging unit 116b.

The second imaging unit 316b has a configuration similar to the second imaging unit 116b. However, the second imaging unit 316b includes a third engaging member 316e and a fourth engaging member 316i, instead of the first engaging member 116e. The third engaging member 316e is an example of a third engaging portion. Similarly to the first engaging member 116e, the third engaging member 316e is provided at one end in the width direction A2 of the second imaging unit 316b, to be guided by the first guide member 102b. The second cam member 134 is located inside the third engaging member 316e. The fourth engaging member 316i is an example of a fourth engaging portion. The fourth engaging member 316i is provided at one end in the width direction A2 of the second imaging unit 316b and above the third engaging member 316e, to be guided by the first guide member 102b. The second cam member 134 is not located inside the fourth engaging member 316i. Thus, the medium conveying apparatus can stably slide the second imaging unit 316b by the third engaging member 316e and the fourth engaging member 316i.

In this case, the second engaging member provided on the side opposite to the third engaging member 316e and the fourth engaging member 316i in the second imaging unit 316b may have a cylindrical shape, i.e., may be provided so that the length in the height direction A3 is substantially the same as the length in the medium conveying direction A1. That is, the distance between the upper end and the lower end of the second engaging member may be set to be shorter than the distance between the lower end of the third engaging member 316e and the upper end of the fourth engaging member 316i. Thus, the medium conveying apparatus can reduce the sliding load between the second imaging unit 316b and the respective guide members, by reducing the area in which the second imaging unit 316b is in contact with the respective guide members at both ends of the width direction A2. Therefore, the medium conveying apparatus can satisfactorily slide the second imaging unit 316b.

As described in detail above, the medium conveying apparatus can further reduce the apparatus size, even when the fourth engaging member 316i is provided above the third engaging member 316e.

Figure 21:
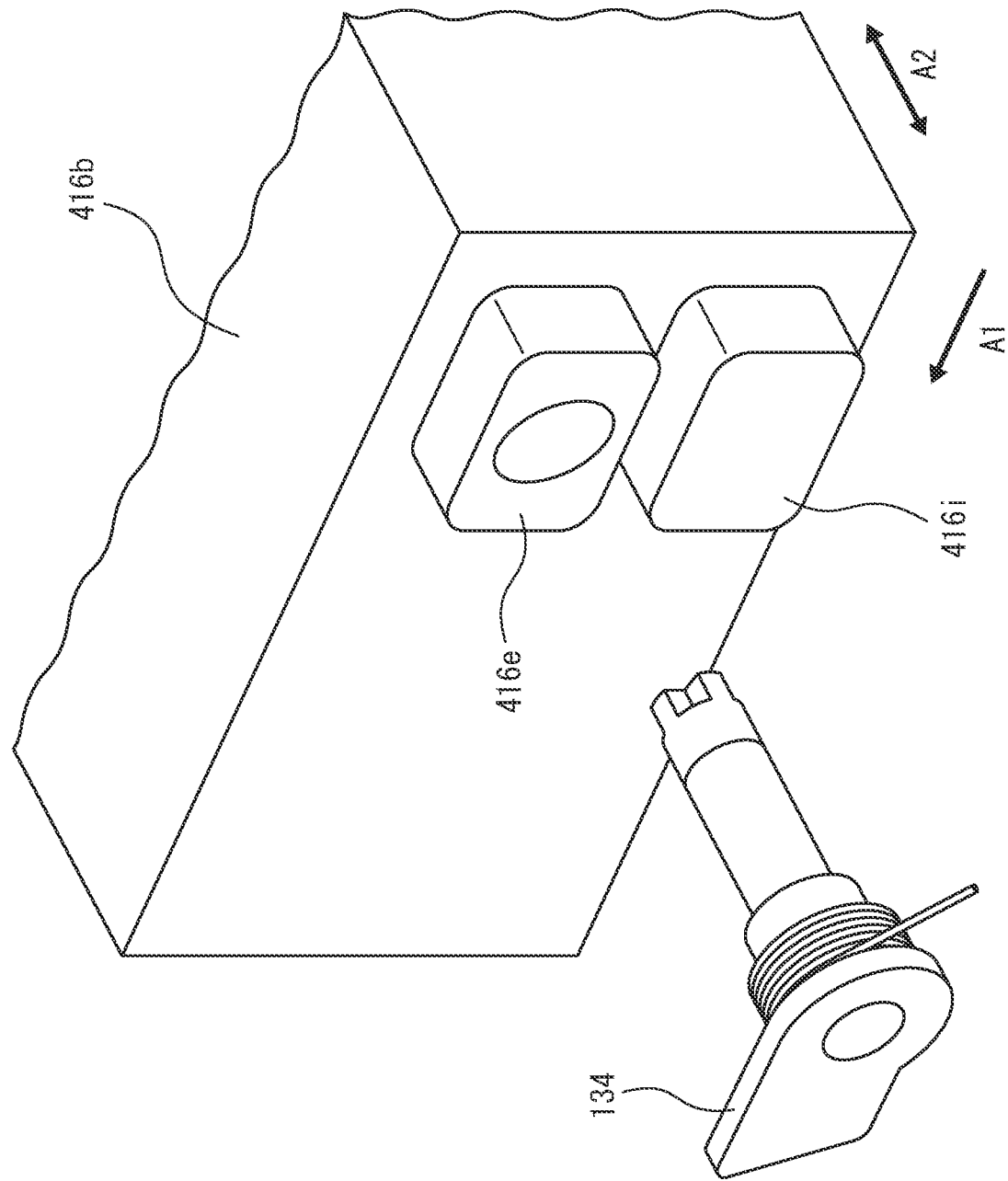
FIG. 21 is a schematic diagram for illustrating another second imaging unit 416b.

FIG. 21 is a schematic diagram for illustrating a second imaging unit 416b in a medium conveying apparatus according to still another embodiment.

As shown in FIG. 21, the medium conveying apparatus according to the present embodiment includes a second imaging unit 416b, instead of the second imaging unit 116b.

The second imaging unit 416b has a configuration similar to the second imaging unit 116b. However, the second imaging unit 416b includes a third engaging member 416e and a fourth engaging member 416i, instead of the first engaging member 116e. The third engaging member 416e and the fourth engaging member 416i have configurations similar to the third engaging member 316e and the fourth engaging member 316i, respectively. However, the fourth engaging member 416i is provided below the third engaging member 416e.

Also in this case, the second engaging member provided on the side opposite to the third engaging member 316e and the fourth engaging member 316i in the second imaging unit 316b may be provided so that the length in the height direction A3 is substantially the same as the length in the medium conveying direction A1. That is, the distance between the upper end and the lower end of the second engaging member may be set to be shorter than the distance between the upper end of the third engaging member 416e and the lower end of the fourth engaging member 416i.

As described in detail above, the medium conveying apparatus can further reduce the apparatus size, even when the fourth engaging member 416i is provided below the third engaging member 416e.

Figure 22:
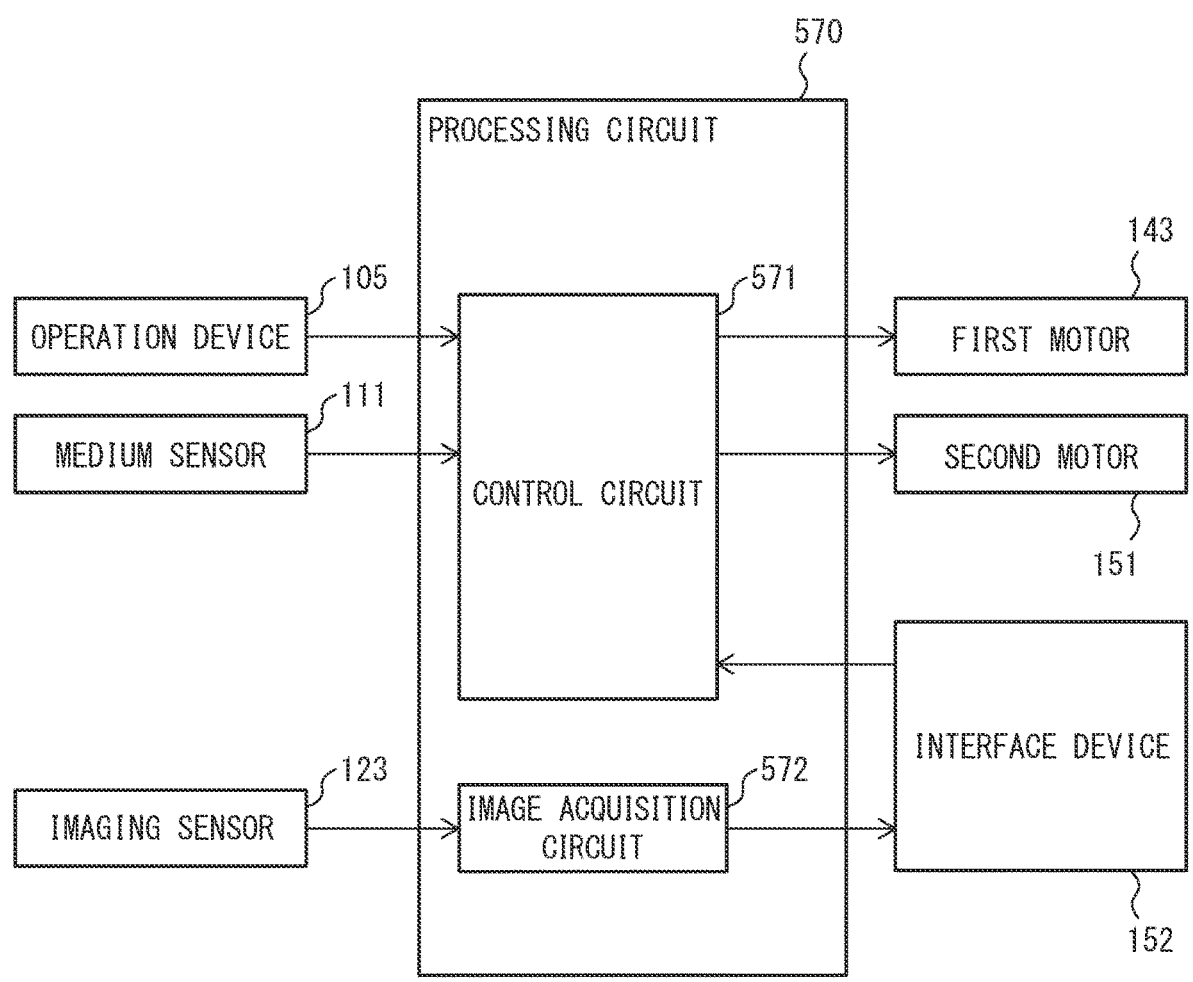
FIG. 22 is a diagram illustrating a schematic configuration of another processing circuit 570.

FIG. 22 is a diagram illustrating a schematic configuration of a processing circuit 570 in a medium conveying apparatus according to yet another embodiment. The processing circuit 570 is used in place of the processing circuit 170 of the medium conveying apparatus 100 and executes the medium read process, etc., instead of the processing circuit 170. The processing circuit 570 includes a control circuit 571 and an image acquisition circuit 572, etc. Note that each unit may be configured by an independent integrated circuit, a microprocessor, firmware, etc.

The control circuit 571 is an example of a control module, and has a function similar to the control module 171. The control circuit 571 receives the operation signal from the operation device 105 or the interface device 152 and the medium signal from the medium sensor 111, and controls the first motor 143 and the second motor 151 based on the received information.

The image acquisition circuit 572 is an example of an image acquisition module, and has a function similar to the image acquisition module 172. The image acquisition circuit 572 acquires the input image from the imaging sensor 123, corrects the acquired input image and outputs it to the interface device 152.

As described in detail above, the medium conveying apparatus can further reduce the apparatus size even when using the processing circuit 570.

While preferred embodiments have been described above, embodiments are not limited to the above. For example, the first imaging unit may be provided in the upper housing 102, and the second imaging unit may be provided in the lower housing 101 so as to move according to the thickness of the conveyed medium.

According to the embodiment, the medium conveying apparatus in which the backing is provided in the unit movably located to face the imaging sensor, can further reduce the apparatus size.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A medium conveying apparatus comprising:
   a conveying roller to convey a medium;
   a first unit;
   a second unit facing the first unit;
   an imaging sensor provided in the first unit, to image the medium conveyed by the conveying roller;
   a reference member including a facing surface, and provided in the second unit in such a way that the facing surface is rotatable between a facing position at which the facing surface faces the imaging sensor, and a non-facing position at which the facing surface deviates from the facing position;
   a guide portion to slidably guide the second unit in a direction perpendicular to a medium conveying surface so that the second unit moves in the direction perpendicular to the medium conveying surface; and
   a support portion to rotatably support the reference member; wherein
   a width of the guide portion is smaller than a length of the second unit in a medium conveying direction; and wherein
   the support portion is located inside the guide portion.

2. The medium conveying apparatus according to claim 1, further comprising:
   a first engaging portion provided at one end in a direction perpendicular to a medium conveying direction of the second unit, to be guided by the guide portion, wherein the support portion is located inside the first engaging portion;
   a second engaging portion provided at another end in the direction perpendicular to the medium conveying direction of the second unit; and
   a second guide portion to slidably support the second engaging portion in the direction perpendicular to the medium conveying surface, wherein
   a distance between an upper end and a lower end of the second engaging portion is set to be larger than a distance between an upper end and a lower end of the first engaging portion.

3. The medium conveying apparatus according to claim 1, further comprising:
   a third engaging portion provided in the second unit, to be guided by the guide portion, wherein the support portion is located inside the third engaging portion; and
   a fourth engaging portion provided in the second unit, above or below the third engaging portion, to be guided by the guide portion.

4. The medium conveying apparatus according to claim 1, further comprising an engaging portion provided in the second unit, to be guided by the guide portion, wherein the support portion is located inside the engaging portion, wherein
   the engaging portion is provided in such a way that a length in the direction perpendicular to the medium conveying surface is longer than a length in a medium conveying direction.

5. The medium conveying apparatus according to claim 1, further comprising an engaging portion provided in the second unit, to be guided by the guide portion, wherein the support portion is located inside the engaging portion, wherein
   the engaging portion is located at a position closer to an upstream end than a downstream end of the second unit, in a medium conveying direction.

6. The medium conveying apparatus according to claim 1, wherein
   the second unit includes an engaging portion engaged with the guide portion to slide along the guide portion, and wherein
   the support portion is located inside the engaging portion and contacts the engaging portion.

* * * * *